(12) United States Patent
Kim et al.

(10) Patent No.: US 11,716,205 B2
(45) Date of Patent: Aug. 1, 2023

(54) NONVOLATILE MEMORY DEVICE STORING A PUBLIC KEY AND A SECRET KEY, AND AN ELECTRONIC DEVICE COMPRISING THE SAME

(71) Applicant: SAMSUNG ELECTRONICS CO., LTD., Suwon-si (KR)

(72) Inventors: Chan Ho Kim, Seoul (KR); Dae Seok Byeon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 17/161,124

(22) Filed: Jan. 28, 2021

(65) Prior Publication Data

US 2021/0367792 A1 Nov. 25, 2021

(30) Foreign Application Priority Data

May 19, 2020 (KR) .................. 10-2020-0059441

(51) Int. Cl.
*H04L 9/32* (2006.01)
*H04L 9/08* (2006.01)
*G11C 16/04* (2006.01)
*H04L 9/14* (2006.01)

(52) U.S. Cl.
CPC ........ *H04L 9/3249* (2013.01); *G11C 16/0483* (2013.01); *H04L 9/0825* (2013.01); *H04L 9/0861* (2013.01); *H04L 9/14* (2013.01)

(58) Field of Classification Search
None
See application file for complete search history.

(56) References Cited

U.S. PATENT DOCUMENTS

| | | |
|---|---|---|
| 8,347,072 B2 | 1/2013 | Mittal |
| 8,885,820 B1 | 11/2014 | Lambert et al. |
| 8,971,530 B2 | 3/2015 | Nemiroff |
| 9,800,407 B2 | 10/2017 | Ansari et al. |
| 9,800,410 B1 | 10/2017 | Clayton et al. |
| 9,893,885 B1 | 2/2018 | Miller et al. |
| 2008/0263361 A1* | 10/2008 | Dutta .................... H04L 9/0891 713/182 |

(Continued)

FOREIGN PATENT DOCUMENTS

KR 10-0857760 9/2008

*Primary Examiner* — Bassam A Noaman
(74) *Attorney, Agent, or Firm* — F. Chau & Associates, LLC

(57) ABSTRACT

A memory device includes nonvolatile memory cells, and a secure module to process first data including information about the device stored in the cells to generate a first password key, process second data including information about the device stored in the cells to generate a second password key, generate a public key and a secret key by a public-key cryptography algorithm, using the first password key and the second password key, and provide the first password key, the second password key, the public key, and the secret key to the cells to store the first password key, the second password key, the public key, and the secret key, where the second data is different from the first data, a value of the first password key value and a value of the second password key are prime numbers, and the public key is provided to a host connected to the device.

19 Claims, 16 Drawing Sheets

(56) References Cited

U.S. PATENT DOCUMENTS

| | | | |
|---|---|---|---|
| 2012/0033810 A1* | 2/2012 | Devadas | G06F 21/31 380/46 |
| 2013/0318354 A1* | 11/2013 | Entschew | H04L 9/3247 713/175 |
| 2016/0191255 A1* | 6/2016 | Haensch | G09C 1/00 380/44 |
| 2020/0254969 A1* | 8/2020 | Luchner | B60R 25/01 |
| 2020/0313890 A1* | 10/2020 | Mondello | H04W 4/023 |
| 2021/0042243 A1* | 2/2021 | Ionescu | G11C 13/0059 |

\* cited by examiner

NONVOLATILE MEMORY DEVICE STORING A PUBLIC KEY AND A SECRET KEY, AND AN ELECTRONIC DEVICE COMPRISING THE SAME

CROSS-REFERENCE

This application claims priority under 35 U.S.C. § 119 to Korean Patent Application No. 10-2020-0059441 filed on May 19, 2020 in the Korean Intellectual Property Office, the disclosure of which is incorporated by reference in its entirety.

TECHNICAL FIELD

The present disclosure generally relates to nonvolatile memories, and more particularly relates to a nonvolatile memory device, an electronic device including the nonvolatile memory device, and a service provider interface that stores a public key and a secret key.

DISCUSSION OF RELATED ART

When processing data of a non-volatile memory device, there may be an increasing security risk for data stored in the non-volatile memory device, such as due to security exploits accelerated by advances in artificial intelligence (AI). For example, there may be an increasing demand for high security techniques capable of protecting personally identifiable information, such as biometric information of individuals.

A Rivest Shamir Adleman (RSA) password may be generated by an RSA algorithm for use in a public key cryptosystem. An RSA algorithm is capable of performing digital signature computations.

SUMMARY

Embodiments of the present disclosure may provide a nonvolatile memory device with high security. Embodiments of the present disclosure may provide an electronic device with high security. Embodiments of the present disclosure may provide a service provider interface that sends and receives data to and from an electronic device with high security.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

An exemplary embodiment nonvolatile memory device protects data stored therein using public/private key cryptography, such as but not limited to a Rivest Shamir Adleman (RSA) password. Specific details of other embodiments are included in the detailed description and drawings.

According to an embodiment of the present disclosure, there is provided a nonvolatile memory device comprising a memory cell array and a secure module, wherein the secure module is configured to process first data including information about the nonvolatile memory device stored in the memory cell array to generate a first password key, process second data including information about the nonvolatile memory device stored in the memory cell array to generate a second password key, generate a public key and a secret key by an RSA algorithm, using the first password key and the second password key, and provide the first password key, the second password key, the public key, and the secret key to the memory cell array, where the memory cell array is configured to store the first password key, the second password key, the public key, and the secret key, the second data is different from the first data, a value of the first password key and a value of the second password key are prime numbers, and the public key is provided to a host connected to the nonvolatile memory device.

According to an embodiment of the present disclosure, there is provided an electronic device comprising a first memory device including a first memory cell array; and a second memory device including a second memory cell array, wherein the first memory device is configured to store first data and second data including information about the first memory device in the first memory cell array, the second memory device is configured to store third data and fourth data including information about the second memory device in the second memory cell array, the first to fourth data are different from each other, the first memory device is configured to process the first data to generate a first password key, process the second data to generate a second password key, a value of the first password key and a value of the second password key being prime numbers, generate a first public key and a first private key by an RSA algorithm, using the first password key and the second password key, and store the first password key, the second password key, the first public key and the first private key in the first memory cell array, the second memory device is configured to process the third data to generate a third password key, process the fourth data to generate a fourth password key, a value of the third password key and a value of the fourth password key being prime numbers, generate a second public key and a second private key by the RSA algorithm, using the third password key and the fourth password key, and store the third password key, the fourth password key, the second public key and the second private key in the second memory cell array, and the first to fourth password keys are different from each other, the first and second public keys are different from each other, and the first and second private keys are different from each other.

According to an embodiment of the present disclosure, there is provided a service provider interface comprising a decryption circuit; an encryption circuit; a receiver configured to receive a first signal from an electronic device; and a transmitter configured to provide a second signal to the electronic device, wherein the first signal includes encryption data generated using a secret key of the electronic device, the secret key is generated together with a public key by an RSA algorithm, using a first password key and a second password key of the electronic device, the first password key is generated by processing first data including information about a memory device included in the electronic device, the second password key is generated by processing second data different from the first data and including information about the memory device included in the electronic device, and the decryption circuit is configured to decrypt the encryption data.

BRIEF DESCRIPTION OF THE DRAWINGS

The above and other embodiments of the present disclosure will become more apparent by describing in detail exemplary embodiments thereof with reference to the attached drawings, in which.

DETAILED DESCRIPTION

Hereinafter, embodiments according to the present disclosure will be explained with reference to the accompanying drawings. An electronic device 1 including a semiconductor device 100 will be explained with reference to FIGS. 1 to 7.

Figure 1:
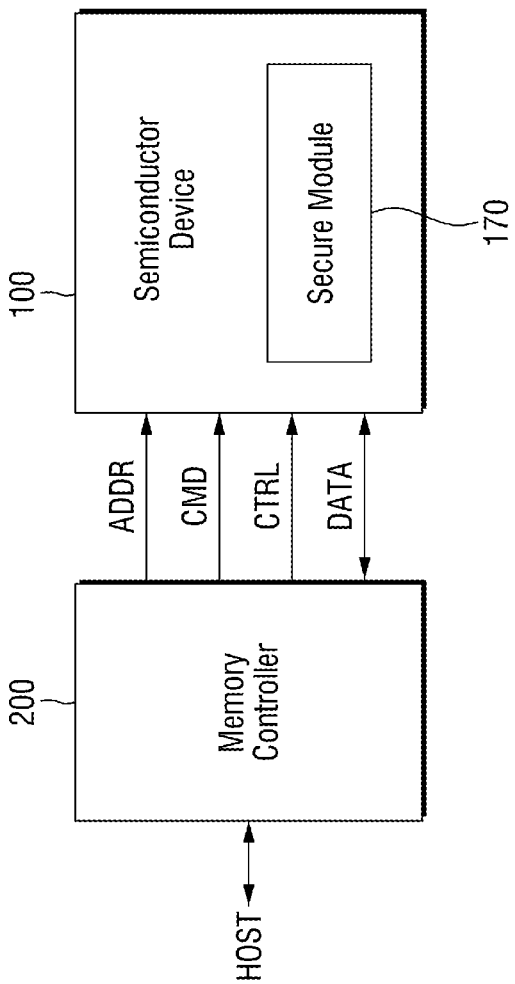
FIG. 1 is a block diagram for explaining an electronic device according to an embodiment of the present disclosure.
Figure 2:
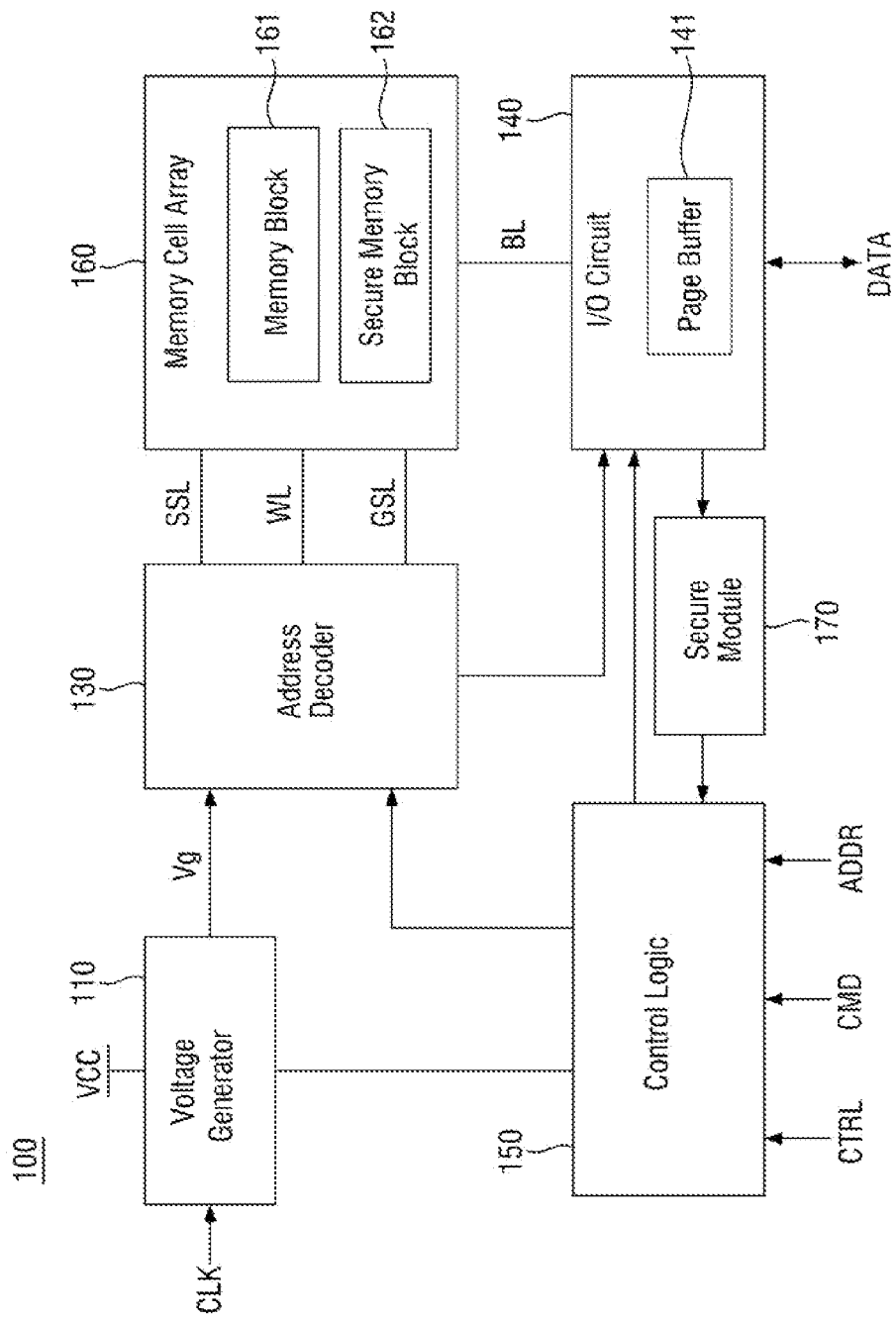
FIG. 2 is a block diagram for explaining a semiconductor device of FIG. 1.
Figure 3:
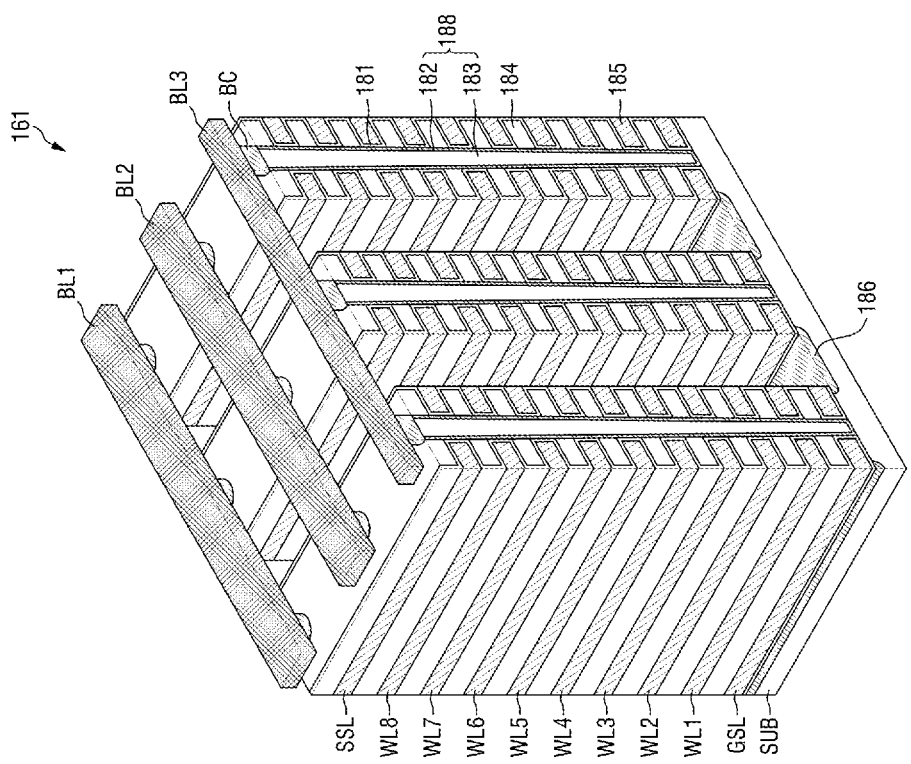
FIG. 3 is a diagram for explaining a memory block of FIG. 2.

FIG. 1 is used for explaining an electronic device according to an embodiment of the present disclosure. FIG. 2 is used for explaining a semiconductor device of FIG. 1. FIG. 3 is used for explaining a memory block of FIG. 2.

The electronic device 1 according to an embodiment of the present disclosure may include a semiconductor device 100 and a memory controller 200. The semiconductor device 100 may include a secure module 170.

The electronic device 1 may be implemented as, for example, but not limited to, a smart card, a secure digital (SD) card, a multimedia card (MMC), an embedded MMC (eMMC), an embedded multi-chip package (eMCP), a perfect page NAND (PPN), a universal flash storage (UFS), a USB flash drive, a solid state drive (SSD) an embedded SSD (eSSD), or the like. For example, the electronic device 1 may be or include a digital camera, a digital video camera, a mobile phone, or a tablet computer.

Although the semiconductor device 100 may include, for example, a NAND flash memory, a vertical NAND (VNAND), a NOR flash memory, a resistive memory such as a Resistive Random Access Memory (RRAM), a Phase-Change Memory (PRAM), a Magneto resistive Random Access Memory (MRAM), a Ferroelectric Random Access Memory (FRAM), a Spin Transfer Torque Random Access Memory (STT-RAM) and/or the like, embodiments are not limited to these examples.

The memory controller 200 generally controls the operation of the semiconductor device 100. The memory controller 200 interprets a command provided from the host, and may control the operation of the semiconductor device 100, for example, to execute program, read, erase operations and the like, in accordance with the interpretation result.

Hereinafter, the present disclosure will be described by taking the semiconductor device 100 as a vertical NAND flash memory (VNAND) as an example. However, embodiments according to the present disclosure are not limited to such examples. That is, embodiments according to the present disclosure may be applied to any combination of the aforementioned nonvolatile memory types, without limitation thereto.

Referring to FIG. 2, the semiconductor device 100 may include a voltage generator 110, an address decoder 130, an I/O circuit 140, a controller 150, a memory cell array 160, and the secure module 170.

The voltage generator 110 may generate an operating voltage Vg necessary for operating the semiconductor device 100, using a power supply voltage Vcc. Although examples of the operating voltage Vg may include a program voltage, a pass voltage, a read voltage, a read pass voltage, a verifying voltage, an erasing voltage, a common source line voltage, a well voltage, and the like, embodiments are not limited thereto.

The voltage generator 110 may program new data in the memory cells disposed in the memory cell array 160, read the data stored in the memory cells, or generate the word line voltage required for erasing the data stored in the memory cells.

The address decoder 130 may select a memory block (e.g., 161 and/or 162) of the memory cell array 160 in response to an address ADDR. Further, the address decoder 130 may be connected to the memory cell array 160 through a plurality of word lines WL, at least one string selection line SSL, and at least one ground selection line GSL.

The address decoder 130 may select the word line WL, the string selection line SSL and the ground selection line GSL, using a decoded row address in response to the address ADDR. Also, the address decoder 130 may decode a column address among the input addresses in response to the address ADDR. The decoded column address may be transmitted to the I/O circuit 140. In an embodiment, the address decoder 130 may include a row decoder, a column decoder, an address buffer, and the like.

The I/O circuit 140 may be connected to the memory cell array 160 through a bit line BL. The I/O circuit 140 may receive the decoded column address from the address decoder 130. The I/O circuit 140 may select the bit line BL from a plurality of bit lines using the decoded column address.

The I/O circuit 140 may include a page buffer 141 that stores data to be programmed when the semiconductor device 100 executes a program operation, or that stores read data when the read operation is executed. Here, the page buffer 141 may include a plurality of latches, without limitation thereto.

At the time of the program operation, the data stored in the page buffer 141 may be programmed into the page corresponding to the selected memory block through the bit line BL. The data, which is read from the page corresponding to the memory block selected at the time of the read operation, may be stored in the page buffer 141 through the bit line BL.

The controller 150 may control the overall operations such as program, read, erase, etc. of the semiconductor device 100. Specifically, the controller 150 may control the operations of the voltage generator 110, the address decoder 130, and the I/O circuit 140 while the semiconductor device 100 operates. The controller 150 may operate in response to control signals CTRL or command signals CMD that are input from the outside. Although the drawings show only the configuration in which the controller 150 controls the operations of the voltage generator 110, the address decoder 130 and the I/O circuit 140, embodiments are not limited thereto. If desired, the semiconductor device 100 may include more components in addition to the shown components, where the controller 150 controls the overall operations of these components.

The memory cell array 160 may be connected to the address decoder 130 and the I/O circuit 140. The memory cell array 160 may include a memory block 161 and a secure memory block 162. The address decoder 130 may be connected to the memory block 161 and the secure memory block 162 through the word line WL, the string selection line SSL and the ground selection line GSL. The I/O circuit 140 may be connected to the memory block 161 and the secure memory block 162 through the bit line BL.

The memory cell array 160 may have a three-dimensional memory array structure. For example, the memory block 161 and the secure memory block 162 may have the three-dimensional array structure. The memory block 161 and the secure memory block 162 may include a plurality of strings of a three-dimensional structure arranged on the substrate along a first direction and a second direction different from the first direction, and arranged in a third direction perpendicular to a plane formed by the first and second directions. Here, each of the plurality of strings may include at least one string selection transistor, a plurality of memory cells, and at least one ground selection transistor that are serially connected between the bit line BL and the common source line. Here, each of the plurality of memory cells may store at least one bit. In an embodiment, at least one dummy cell may be included between at least one string selection transistor and the plurality of memory cells. In an embodiment, at least one dummy cell may be included between the plurality of memory cells and the at least one ground selection transistor.

Referring to FIG. 3, the memory block 161 may be formed in a direction perpendicular to the substrate SUB. Although only the memory block 161 is shown with specificity in the drawing, embodiments according to the present disclosure are not limited thereto, and the secure memory block 162 may also have a from as shown in FIG. 3. For example, an n+ doping region 186 containing impurities may be formed in the substrate SUB. Such a doping region 186 may be used as a common source line.

Gate electrodes 185 and insulating films 184 may be alternately stacked on the substrate SUB. A data storage film 181 may be formed between each gate electrode 185 and each insulating film 184.

A pillar 188 may vertically penetrate the gate electrode 185 and the insulating film 184. The pillar 188 may be formed in a V shape as shown. The pillar 188 may penetrate the gate electrode 185 and the insulating film 184 and be connected to the substrate SUB. An interior of the pillar 188 is a charging dielectric pattern 183 which may be made of an insulating material such as silicon oxide. An exterior of the pillar is a vertical active pattern 182 which may be made of a channel semiconductor.

The gate electrode 185 of the memory block 161, or similarly of the secure memory block 162, may be connected to the ground selection line GSL, the plurality of word lines WL1 to WL8, and the string selection line SSL. The vertical active pattern 182 may be connected to a plurality of bit lines BL1 to BL3 through a bit line contact BC. In FIG. 3, although the memory block 161 is shown to have eight word lines WL1 to WL8 and three bit lines BL1 to BL3, embodiments are not limited thereto.

Referring to FIG. 2 again, although the secure module 170 may be connected to the I/O circuit 140 and the controller 150, embodiments according to the present disclosure are not limited thereto. For example, the secure module 170 may be included in the controller 150, and the functionality of the secure module 170 may be implemented by the controller 150.

In an example, the functionality of secure module 170 may be implemented by a memory controller such as the memory controller 200 of FIG. 1. The secure module 170 may read the data from the memory cell array 160 to generate a password key, a public key and at least one private or secret key through a method described infra. The secure module 170 may store the generated password key, public key, and secret key in the memory cell array 160, such as in the secure memory block 162. The secure module 170 may provide only the public key to the host, and need not provide the password key or the secret key to the host.

The host may access the memory cell array 160. For example, the host HOST may access the memory block 161 and the secure memory block 162. The memory block 161 may be accessed by a general access command provided from the host HOST. The secure memory block 162 may be accessed by a security access command provided from the host HOST.

The memory block 161 may store data that is intended for write or read by the host HOST. The secure memory block 162 may store data related to security of the semiconductor device 100. For example, the secure memory block 162 may store data of a password key, a public key and a secret key, described infra.

The host HOST cannot access the data stored in the secure memory block 162 with a general access command That is, the data stored in the secure memory block 162 is not accessed from outside of the secure module 170, and not even by the host HOST.

Hereinafter, a method of generating the password keys p and q, the secret key SK and the public key PK of the semiconductor device 100 will be explained referring to FIGS. 4 to 7.

Figure 4:
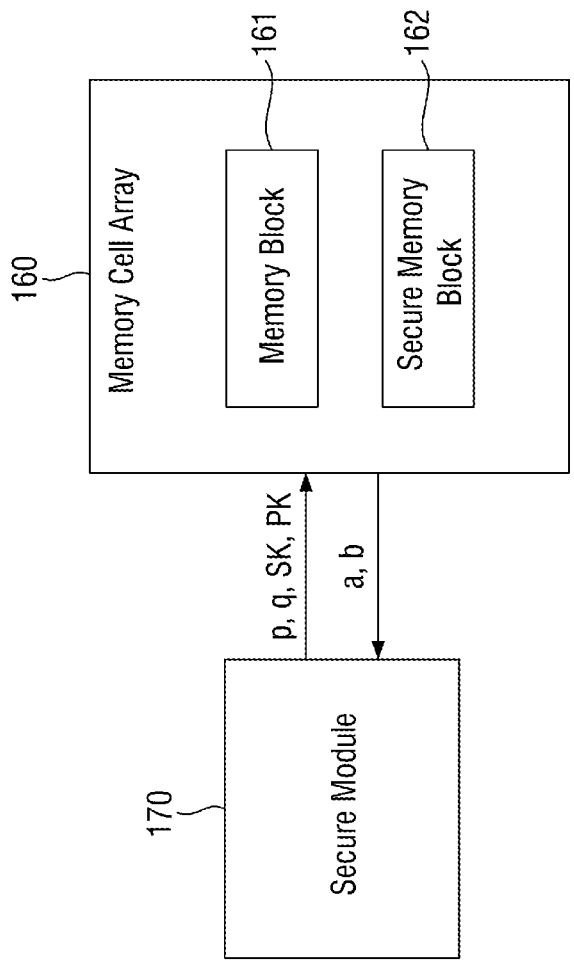
FIG. 4 is a block diagram for explaining password key generation of the semiconductor device according to an embodiment.
Figure 5:
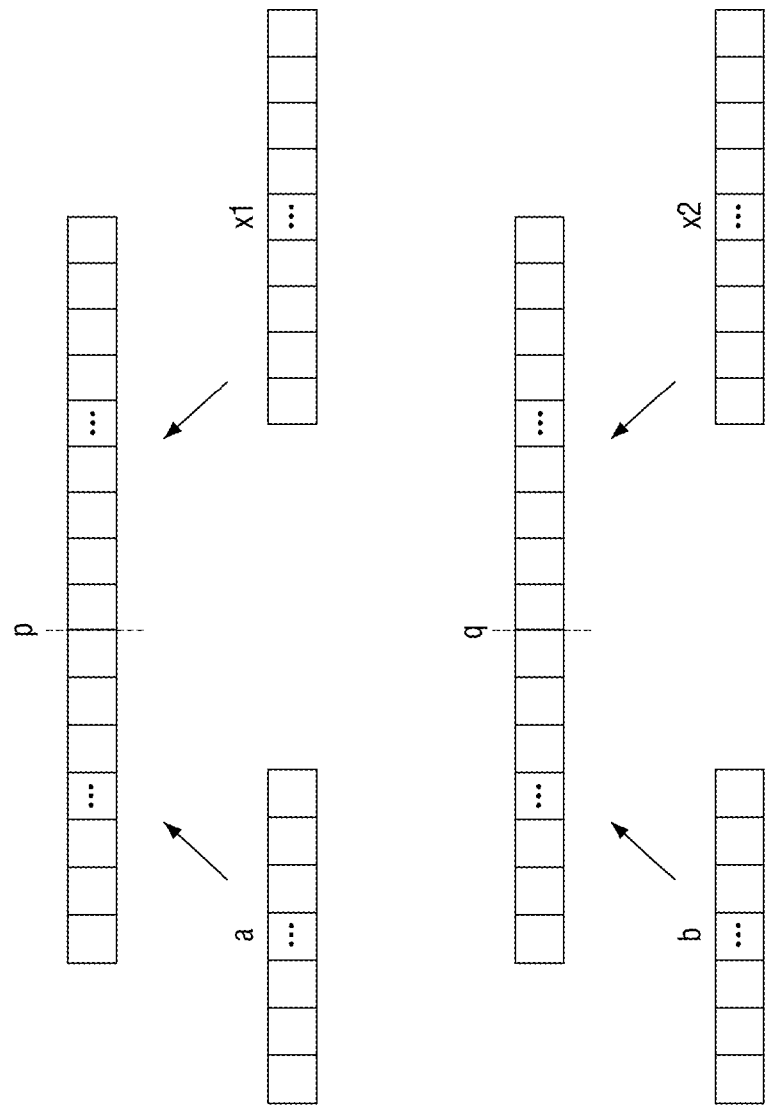
FIG. 5 is a conceptual data diagram for explaining password key generation of the semiconductor device according to an embodiment.
Figure 6:
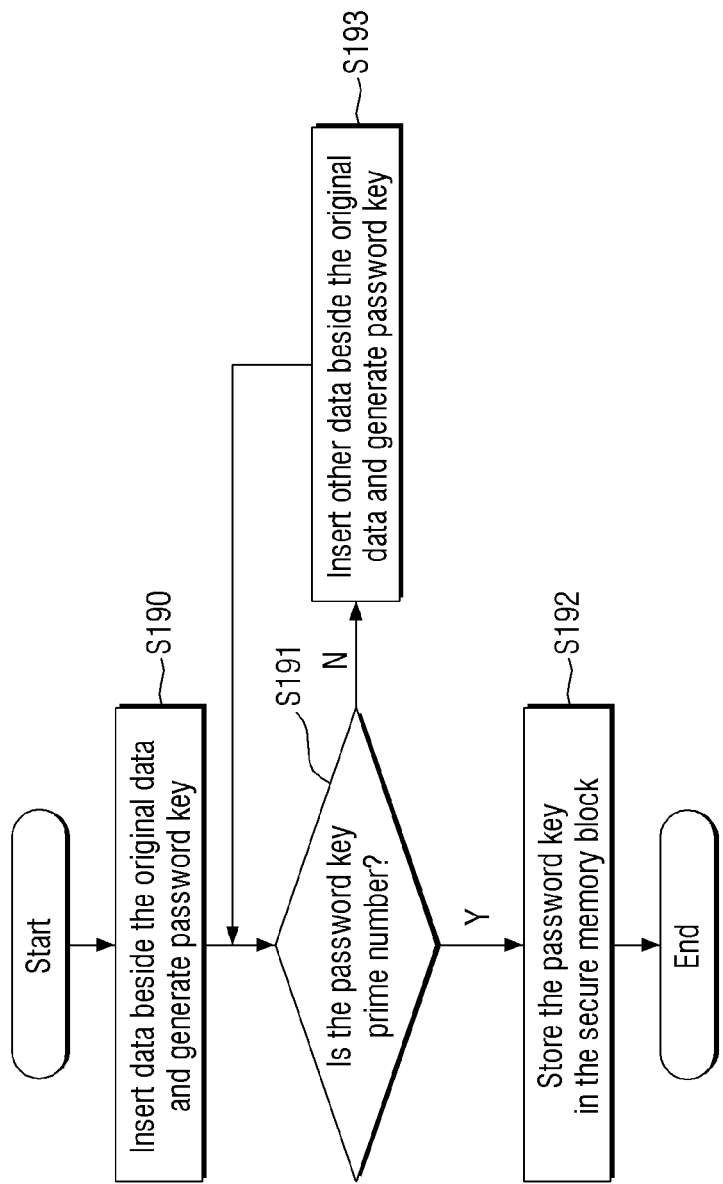
FIG. 6 is a flowchart diagram for explaining password key generation of the semiconductor device according to an embodiment.
Figure 7:
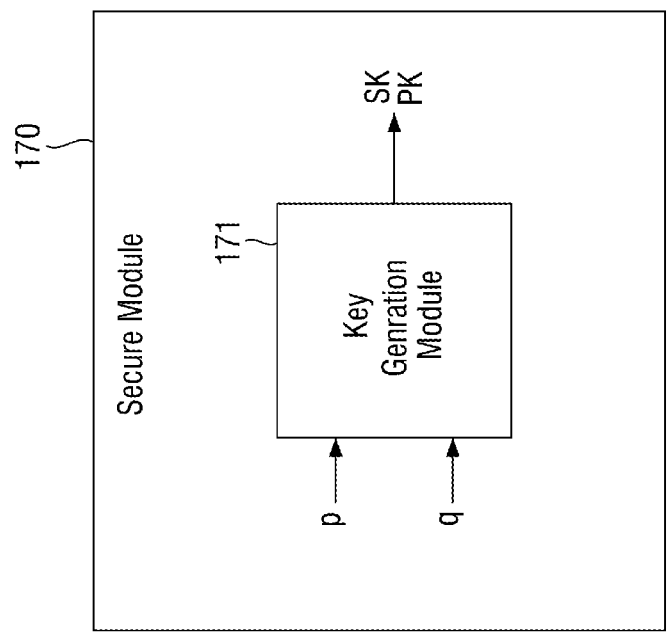
FIG. 7 is a block diagram for explaining password key generation of the semiconductor device according to an embodiment.

FIG. 4 is used for explaining the password key generation of the semiconductor device according to an embodiment. FIG. 5 is used for explaining the password key generation of the semiconductor device according to an embodiment. FIG. 6 is used for explaining the password key generation of the semiconductor device according to an embodiment. FIG. 7 is used for explaining the password key generation of the semiconductor device according to an embodiment.

Referring to FIG. 4, the memory cell array 160 and the secure module 170 may send and receive data (a, b, p, q, SK and PK). For example, first data a and second data b stored in the secure memory block 162 may be provided to the secure module 170. The secure module 170 may provide the memory cell array 160 with a first password key p, a second password key q, a secret key SK and a public key PK.

In an embodiment, the secure memory block 162 may store the first data a, the second data b, as well as the generated first password key p, generated second password key q, generated secret key SK and generated public key PK. However, embodiments according to the present disclosure are not limited thereto. For example, the public key PK may also be stored in the memory block 161.

The first data a may include unique identification (ID) data including production information of the semiconductor device 100. The unique ID data may correspond to unique information that differs for each semiconductor device 100. For example, the unique ID data may include or be based on the number of Fab in which the semiconductor device 100 is produced, the number of wafers, the wafer test time, and an arbitrary number. The first data a is stored in the secure memory block 162, and may not be accessed by a general access command of the host HOST. That is, the first data a is not accessed from the outside.

The second data b may include direct current (DC) trim data that includes information about operating characteristics of the semiconductor device 100. The DC trim data may correspond to unique information that differs for each semiconductor device 100. For example, the DC trim data is for matching the operating characteristics of each semiconductor device 100, and may differ for each semiconductor device 100. The DC trim data may not be disclosed to or accessed from the outside. The second data b is stored in the secure memory block 162, and may not be accessed by a general access command of the host HOST. That is, the second data b is not accessed from the outside. Therefore, a semiconductor device 100 with high security can be provided.

The first data a and the second data b are not limited to the aforementioned data, and may include other data instead of or in addition to such data. That is, the first data a and the second data b may include data based on unique information of the semiconductor device 100, that are stored in the secure memory block 162, and that are not accessed from the outside.

Referring to FIGS. 5 and 6, the secure module 170 may generate a first password key p and a second password key q, using the first data a and the second data b, respectively, provided from the memory cell array 160.

The secure module 170 may insert data into or concatenate it with original data to generate a password key at function block S190, without limitation. For example, the secure module 170 may insert data x1 into the first data a to generate the first password key p. The data x1 may be data including m bits including an arbitrary random number. For example, the secure module 170 may insert the data x2 into the second data b to generate the second password key q. The data x2 may be data including n bits including an arbitrary random number. Here, m and n may be natural numbers of 1 or more. In an alternate embodiment, the inserted data values may be unique salt values, and each respective password key may be generated by a hash function based on the respective inserted data and the respective original data.

The secure module 170 may determine whether the value of the password key generated through the aforementioned process is a prime number at decision block S191. Here, the prime number is a positive integer greater than 1 that is not divisible by any other number between 1 and itself. For example, the prime number may be 2, 3, 5, 7, 11, 13, etc. The secure module 170 may determine that the value of the first password key p is a prime number. The secure module 170 may determine whether the value of the second password key q is also a prime number. Here, the value of the first password key p and the value of the second password key q may be different from each other.

When the value of the respective password key, p or q, is determined to be a prime number at the affirmative or Yes branch of decision block S191-Y, the secure module may provide the respectively generated first password key p or second password key q to the memory cell array 160. The first password key p and the second password key q provided to the memory cell array 160 may be stored in the secure memory block 162 at function block S192.

When the value of the respective password key, p or q, is determined to be a non-prime number at the negative or No branch of decision block S191-N, the secure module may insert data x1 different from the data inserted into the first data a, or may insert data x2 different from the data inserted into the second data b to generate a new password key at function block S193, and control is passed back to the decision block S191. This makes it possible to determine whether the newly generated first password key p and/or second password key q are prime numbers at decision block S191.

The first password key p and the second password key q in which values of the generated password key are prime numbers may each be temporarily stored, preferably one at a time, in the secure module 170. For example, the first password key p or the second password key q may be stored in a volatile memory device such as a dynamic random-access memory (DRAM). However, embodiments according to the present disclosure are not limited thereto, and the first and second password keys may be stored in another memory device that is likewise inaccessible from the outside.

Referring to FIG. 7, the secure module 170 may include a key generation module 171. However, embodiments according to the present disclosure are not limited thereto, and may be implemented by another configuration of the semiconductor device 100.

The key generation module 171 may generate a secret key SK and a public key PK, using the first password key p and the second password key q, respectively. Although the key generation module 171 may generate the secret key SK and the public key PK, using a public-key cryptography or asymmetric cryptography algorithm such as a Rivest Shamir Adleman (RSA) algorithm, embodiments according to the present disclosure are not limited thereto, and the algorithm for generating the secret key SK and the public key PK may include a symmetric-key algorithm such as a Data Encryption Standard (DES) algorithm and/or an Advanced Encryption Standard (AES) algorithm, for example.

A method of generating the secret key SK and the public key PK using the first password key p and the second password key q will be described infra. However, the method is only an example, and embodiments according to the present disclosure are not limited thereto, and may include other first password key p, second password key q, secret key SK and public key PK generation methods.

The value of the first password key p and the value of the second password key q may be prime numbers. For purposes of description by example, it may be assumed that the value of the first password key p is 13 and the value of the second password key q is 11. The public key PK may be generated, for example, by multiplying the first password key p by the second password key q. For example, the value of the public key PK may be 143 obtained by multiplying 13 by 11.

Alternatively, Ø(PK) may be obtained by Equation 1.

$$\emptyset(PK)=(p-1)*(q-1) \quad \text{<Equation 1>}$$

For example, Ø(PK) may be (13−1)*(11−1)=12*10=120.

A natural number e which is smaller than Ø(PK) and relatively prime, mutually prime or coprime to Ø(PK) may be obtained. For example, a natural number e which is larger than 1, smaller than 120 and relatively prime to 120 may be obtained. For purposes of description by example, e may be 23.

It is possible to select d that satisfies Equation 2. Here, e*d≡1(mod Ø(PK)) means that when e*d is divided by Ø(PK), the remainder 120 is obtained.

$$e*d \equiv 1 (\mathrm{mod}\ \emptyset(PK)), 1 < d < \emptyset(PK) \qquad \text{<Equation 2>}$$

For purposes of description by example, the number 47 that satisfies 23*d ≡1(mod 120) and 1<d<120 may be selected as d. That is, d may be 47.

{PK, e} may be a public key, and {PK, d} may be a secret key. For example, the public key generated through the aforementioned process may be {143, 23}, and the secret key may be {143, 47}.

The public key PK may include {PK, e}, and the secret key SK may include {PK, d}. However, embodiments according to the present disclosure is not limited thereto, and the public key PK and the secret key SK may have other values.

In an embodiment, the generated public key PK and secret key SK may be stored in the memory cell array 160. The public key PK and the generated secret key SK may not be stored in the components of the semiconductor device 100 except the memory cell array 160. For example, the public key PK and the secret key SK may be deleted from the secure module 170. The public key PK and the secret key SK may be stored in the secure memory block 162.

In an embodiment, the public key PK may be stored in the memory block 161. The public key PK may be accessed by the host HOST and provided to the host HOST.

The password keys, such as the first password key p and the second password key q, are generated using unique data of the semiconductor device 100, such as, for example, unique ID data and DC trim data without limitation thereto, the public key PK and the secret key SK are generated through the RSA algorithm using the respective password keys, and the first password key p, the second password key q, the public key PK and the secret key SK are stored in the memory cell array 160, such as the memory block 161 for PK and the secure memory block 162 for p, q and SK, thereby storing the password keys and secret key where they cannot be accessed from the outside, whether by the host HOST or any other outside system or device. Therefore, a semiconductor device 100 with high security encryption can be provided.

For example, even if an external component such as the host HOST knows one of the first password key p, the second password key q, or the public key PK, since it would take a long time with substantial processing resources to derive the secret key SK by factorizing a prime number of large value to guess the SK, the security of the semiconductor device 100 can be maintained.

Figure 8:
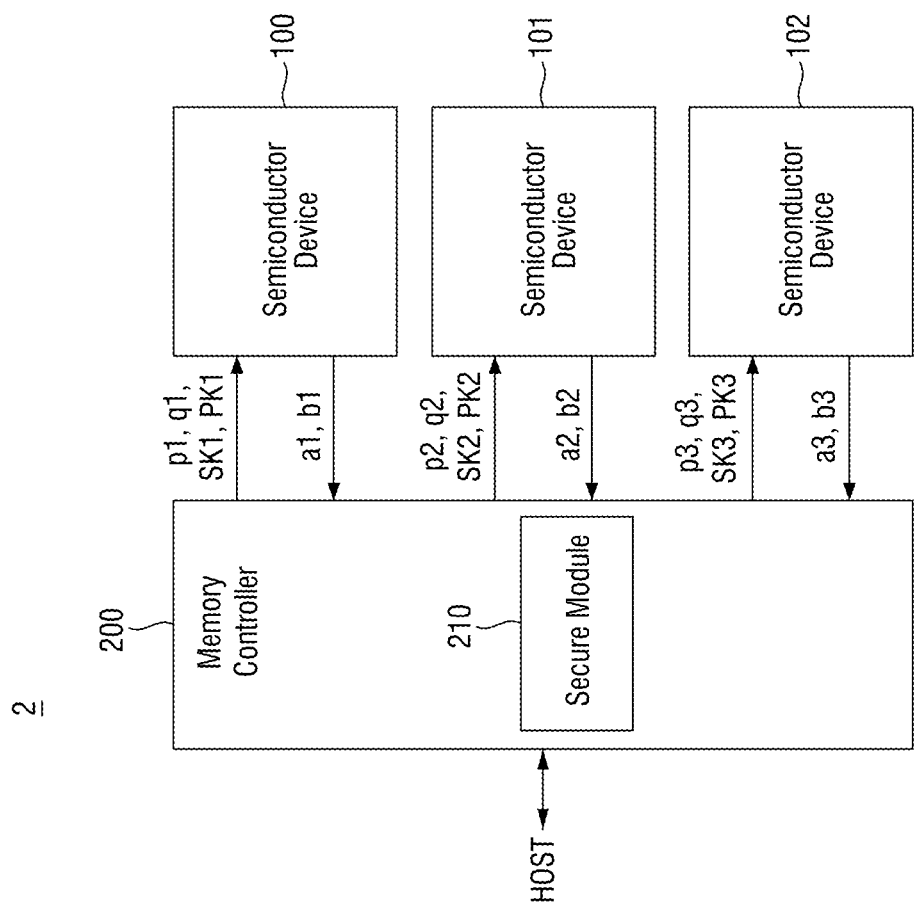
FIG. 8 is a block diagram for explaining an electronic device according to an embodiment.

FIG. 8 is used for explaining an electronic device according to an embodiment. For the sake of convenience of explanation, repeated parts of contents explained using FIGS. 1 to 7 may be more briefly explained or omitted.

Referring to FIG. 8, the electronic device 2 may include a memory controller 200, a first semiconductor device 100, a second semiconductor device 101 and a third semiconductor device 102. Although the semiconductor device 101 and the semiconductor device 102 may have the same structure as the semiconductor device 100 explained using FIGS. 1 to 7, embodiments according to the present disclosure are not limited thereto, and the semiconductor device 101 and the semiconductor device 102 may have different structures from each other.

The memory controller 200 may include a secure module 210. The secure module 210 may be substantially the same as the secure module 170 described using FIG. 4. Although the secure module 210 is shown as being included in the memory controller 200, embodiments according to the present disclosure are not limited thereto, and the secure module 210 may be implemented by being included in each or any of the semiconductor device 100, the semiconductor device 101, and/or the semiconductor device 102.

In an embodiment, the semiconductor device 100 may store first data a1 and second data b1 including information about the semiconductor device 100. The semiconductor device 101 may store first data a2 and second data b2 including information about the semiconductor device 101. The semiconductor device 102 may store first data a3 and second data b3 including information about the semiconductor device 102. The first data a1, the second data b1, the first data a2, the second data b2, the first data a3 and the second data b3 may have values different from each other.

The semiconductor device 100 may provide the memory controller 200 with the first data a1 and the second data b1. The semiconductor device 101 may provide the memory controller 200 with the first data a2 and the second data b2. The semiconductor device 102 may provide the memory controller 200 with the first data a3 and the second data b3.

The secure module 210 may generate the first password key p1, the second password key q1, the secret key SK1 and the public key PK1, using the provided first data a1 and second data b1. The secure module 210 may generate the first password key p2, the second password key q2, the secret key SK2 and the public key PK2, using the provided first data a2 and second data b2. The secure module 210 may generate the first password key p3, the second password key q3, the secret key SK3 and the public key PK3, using the provided first data a3 and second data b3.

The semiconductor device 100 may store the first password key p1, the second password key q1, the secret key SK1 and the public key PK1 provided from the memory controller 200. The semiconductor device 101 may store the first password key p2, the second password key q2, the secret key SK2 and the public key PK2 provided from the memory controller 200. The semiconductor device 102 may store the first password key p3, the second password key q3, the secret key SK3 and the public key PK3 provided from the memory controller 200. The public key PK1, the public key PK2 and the public key PK3 may be provided to the host HOST.

The first password key p1 and the second password key q1 stored in the semiconductor device 100, the first password key p2 and the second password key q2 stored in the semiconductor device 101, and the first password key p3 and the second password key q3 stored in the semiconductor device 102 may have values different from each other.

The secret key SK1 stored in the semiconductor device 100, the secret key SK2 stored in the semiconductor device 101, and the secret key SK3 stored in the semiconductor device 102 may have values different from each other.

The public key PK1 stored in the semiconductor device 100, the public key PK2 stored in the semiconductor device 101, and the public key PK3 stored in the semiconductor device 102 may have values different from each other.

The semiconductor device 100, the semiconductor device 101, and the semiconductor device 102 have different password keys from each other, and when accessing from the outside, since it is necessary to access each semiconductor device with different password keys, an electronic device 2 with high security can be provided.

Hereinafter, an electronic device 3 including the semiconductor device 100 will be explained with reference to FIGS. 9 and 10.

Figure 9:
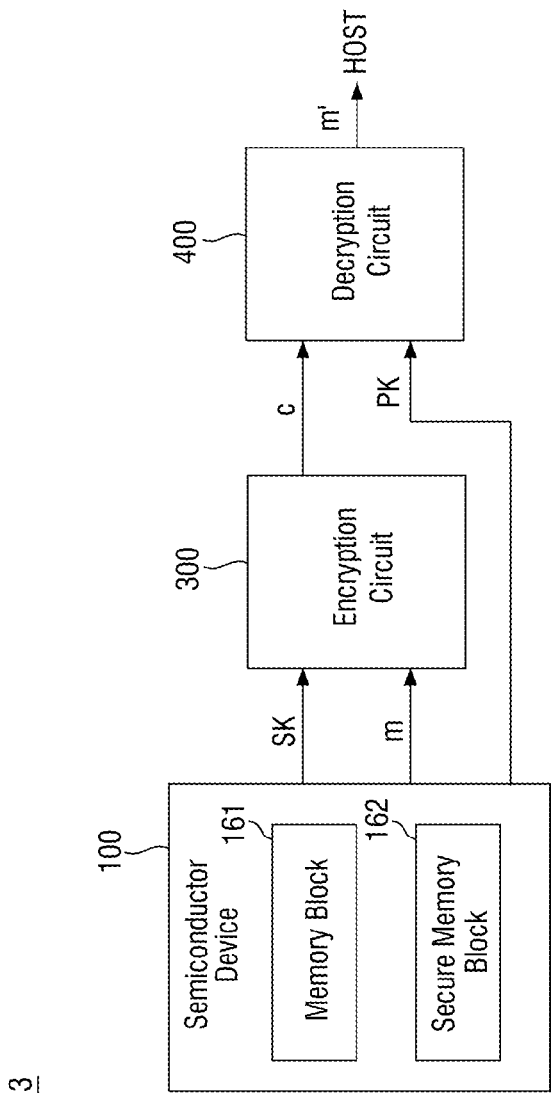
FIG. 9 is a block diagram for explaining an electronic device according to an embodiment of the present disclosure.

FIG. 9 is used for explaining an electronic device according to an embodiment of the present disclosure. FIG. 10 is used for explaining data transfer of the electronic device of FIG. 9. For the sake of convenience of explanation, repeated parts of contents explained using FIGS. 1 to 7 may be briefly explained or omitted.

Figure 10:
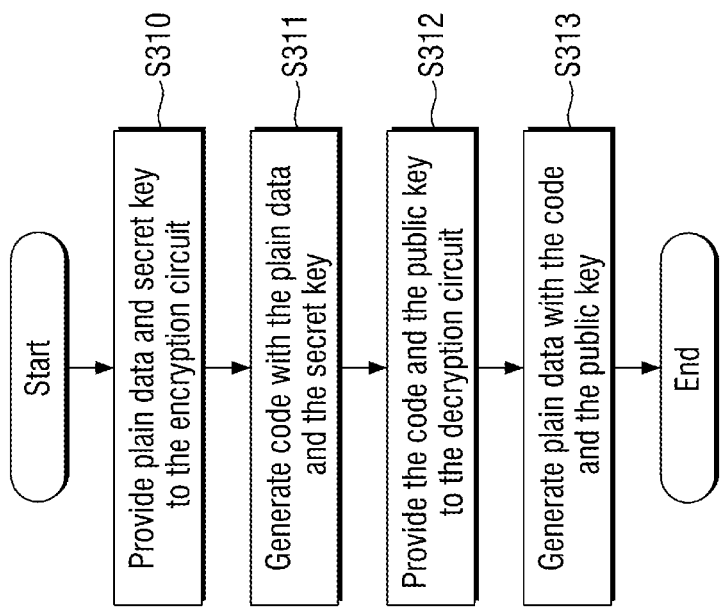
FIG. 10 is a flowchart diagram for explaining data transfer of the electronic device of FIG. 9.

Referring to FIGS. 9 and 10, the electronic device 3 may include a semiconductor device 100, an encryption circuit 300, and a decryption circuit 400. Although FIG. 9 shows that the semiconductor device 100 is separated into the encryption circuit 300 and the decryption circuit 400, embodiments according to present disclosure are not limited thereto. For example, the semiconductor device 100 may include the encryption circuit 300, the semiconductor device 100 may include the decryption circuit 400, or the semiconductor device 100 may include both the encryption circuit 300 and the decryption circuit 400.

The semiconductor device 100 of FIG. 9 may provide plain data m and secret key SK to the encryption circuit 300 of FIG. 9 at function block S310 of FIG. 10. For example, the semiconductor device 100 may provide the plain data m stored in the memory block 161 to the encryption circuit 300. For example, the semiconductor device 100 may provide the secret key SK stored in the memory block 162 to the encryption circuit 300.

The encryption circuit 300 may generate the encryption data c, using the plain data m and the secret key SK at function block S311. For example, the encryption circuit 300 may generate the encryption data c including the encrypted content, using the secret key SK generated through the RSA algorithm by the use of the first password key p and the second password key q which are prime numbers, and the plain data m to be transferred.

The encryption data c and the public key PK may be provided to the decryption circuit 400 at function block S312. For example, the encryption circuit 300 may provide the generated encryption data c to the decryption circuit 400. For example, the semiconductor device 100 may provide the public key PK stored in the memory block 161 or the secure memory block 162 to the decryption circuit 400.

The decryption circuit 400 may generate plain data m', using the encryption data c and the public key PK at function block S313. For example, the decryption circuit 400 may generate plain data m', by decrypting the transmitted encryption data c using the disclosed public key PK. Although the plain data m may be the same as the plain data m', embodiments are not limited thereto. The decrypted plain data m' may be transferred from the decryption circuit 400 to the host HOST. The host HOST may know the decrypted data m' that was securely transferred as the encryption data c from the semiconductor device 100 to the decryption circuit 400, and the electronic device 3 with high security can be provided.

Hereinafter, an electronic device 4 including the semiconductor device 100 will be explained with reference to FIGS. 11 and 12.

Figure 11:
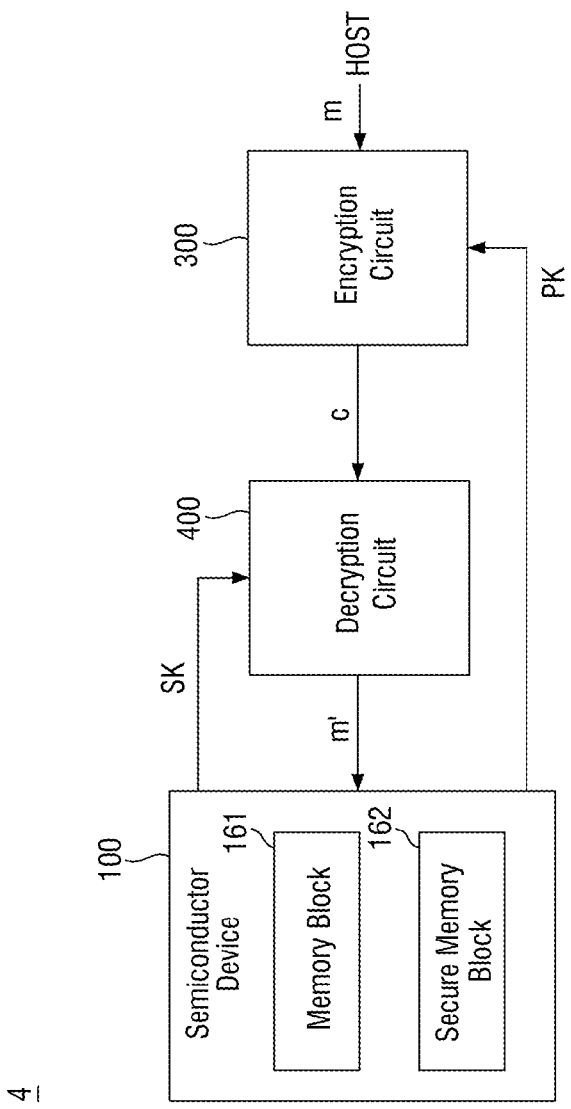
FIG. 11 is a block diagram for explaining an electronic device according to an embodiment.

FIG. 11 is used for explaining an electronic device according to an embodiment. FIG. 12 is used for explaining the data transfer of the electronic device of FIG. 11. For the sake of convenience of explanation, repeated parts of contents explained using FIGS. 1 to 7 may be briefly explained or omitted.

Figure 12:
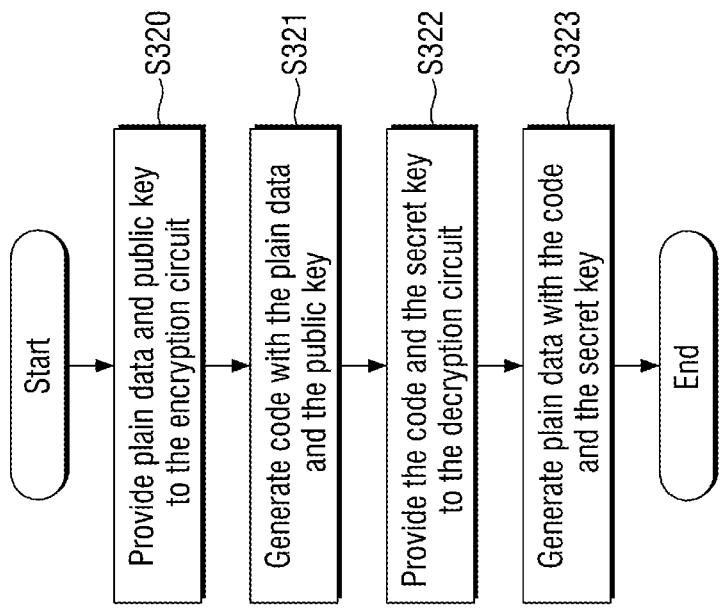
FIG. 12 is a flowchart diagram for explaining the data transfer of the electronic device of FIG. 11.

Referring to FIGS. 11 and 12, the electronic device 4 may include a semiconductor device 100, an encryption circuit 300, and a decryption circuit 400. Although FIG. 11 shows that the semiconductor device 100 is separated from the encryption circuit 300 and the decryption circuit 400, embodiments according to the present disclosure are not limited thereto. For example, the semiconductor device 100 may include the encryption circuit 300, the semiconductor device 100 may include the decryption circuit 400, or the semiconductor device 100 may include both the encryption circuit 300 and the decryption circuit 400.

The encryption circuit 300 may be provided with the plain data m and the public key PK at function block S320. For example, the host HOST may provide the plain data m to the encryption circuit 300. For example, the semiconductor device 100 may provide the public key PK stored in the memory block 161 or the secure memory block 162 to the encryption circuit 300.

The encryption circuit 300 may generate the encryption data c, using the provided plain data m and public key PK at function block S321. For example, the encryption circuit 300 may generate the encryption data c including the encrypted contents, using the public key PK and the plain data m to be transferred from the host.

The decryption circuit 400 may be provided with the encryption data c and the secret key SK at function block S322. For example, the encryption circuit 300 may provide the generated encryption data c to the decryption circuit 400. For example, the semiconductor device 100 may provide the decryption circuit 400 with the secret key SK stored in the secure memory block 162.

The decryption circuit 400 may generate plain data m', using the encryption data c and the secret key SK at function block S323. For example, the decryption circuit 400 generates the plain data m', by decrypting the transferred encryption data c, using the secret key SK that is kept secret from the outside. Although the plain data m may be the same as the plain data m', embodiments are not limited thereto. The decrypted plain data m' may be transferred from the decryption circuit 400 to the semiconductor device 100. As a result, even if another one knows the encryption data c, it cannot be decrypted with only the public key PK, and since the secret key SK is stored in the semiconductor device 100, the electronic device 4 with high security can be provided.

Hereinafter, a communications system 5 including the electronic device 1 will be explained with reference to FIG. 13.

Figure 13:
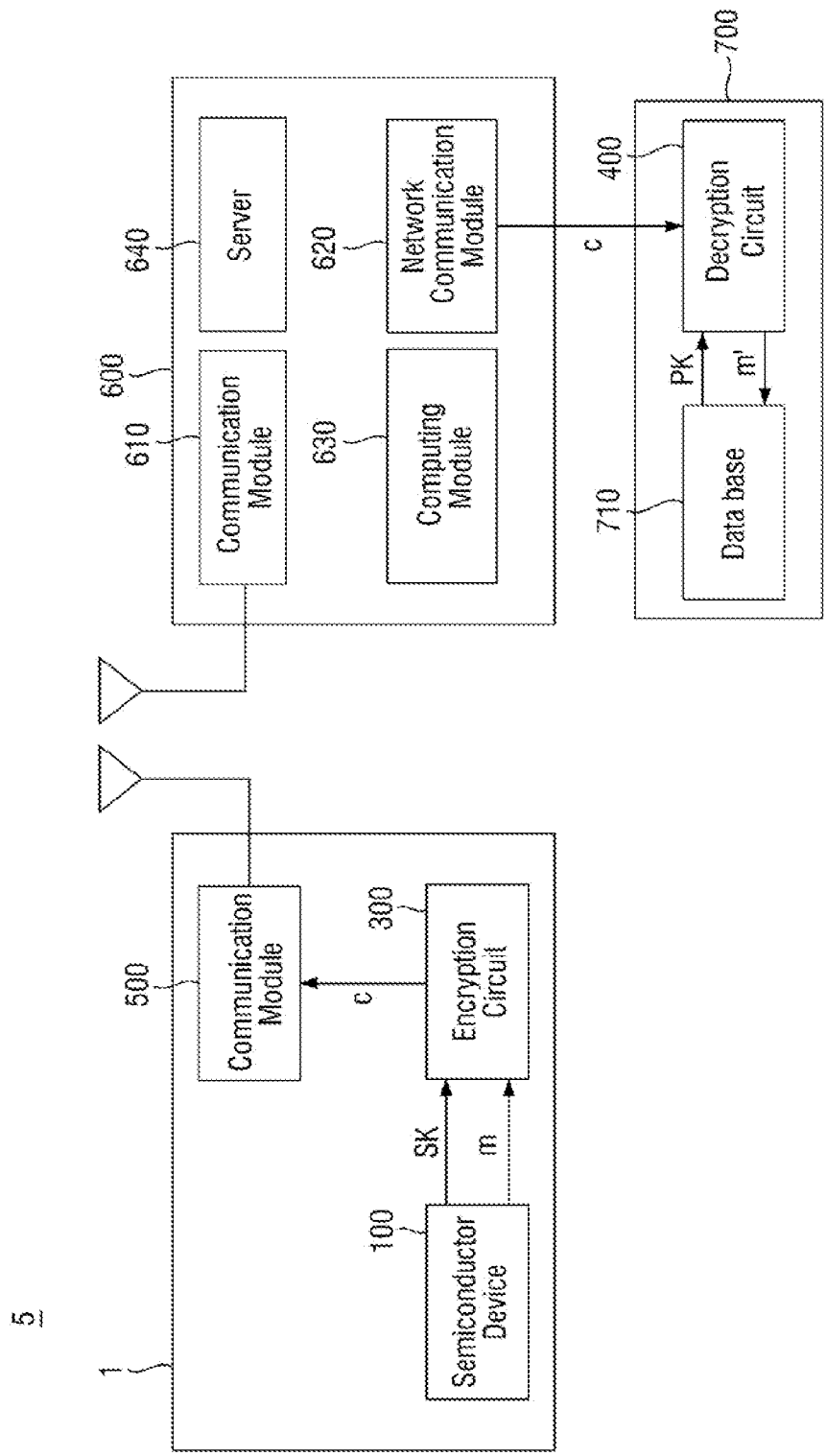
FIG. 13 is a block diagram for explaining a communications system according to an embodiment of the present disclosure.

FIG. 13 is used for explaining a communications system according to an embodiment of the present disclosure. For the sake of convenience of explanation, repeated parts of contents explained using FIGS. 1 to 7 may be briefly explained or omitted.

Referring to FIG. 13, the communications system 5 may include an electronic device 1, a base station 600 and a service provider interface 700.

In an embodiment, the electronic device 1 may include a semiconductor device 100, an encryption circuit 300 and a communications module 500. The semiconductor device 100 may be the same as the semiconductor device 100 explained using FIGS. 1 to 7.

The encryption circuit 300 may generate the encryption data c, using the secret key SK and the plain data m provided from the semiconductor device 100. The encryption circuit

300 may provide the generated encryption data c to the communications module 500.

The communications module 500 may perform functions for transmitting and receiving signals through a wireless channel. For example, the communications module 500 may perform a conversion function between a baseband signal and a bit row, in accordance with a physical layer standard of the system. In addition, the communications module 500 may up-convert the baseband signal into an RF band signal, transmit the RF band signal through the antenna, and down-convert the RF band signal received through the antenna into the baseband signal. For example, the communications module 500 may include a transmission filter, a reception filter, an amplifier, a mixer, an oscillator, a digital-to-analog converter (DAC), an analog-to digital-converter (ADC), and the like.

The communications module 500 may include different communications modules to process signals of different frequency bands. Furthermore, the communications module 500 may include a plurality of communications modules to support a plurality of wireless access technologies different from each other. For example, different wireless access technologies may include a Bluetooth® low energy (BLE), a Wireless Fidelity (WiFi™), a WiGig (WiFi Gigabyte), a cellular network such as Long-Term Evolution (LTE) and the like. Also, different frequency bands may include a super high frequency (SHF) (e.g., 2.5 GHz, 5 GHz) band, and a millimeter wave (e.g., 60 GHz) band.

The communications module 500 may convert the received encryption data c through the aforementioned process and transmit the signal to the base station 600.

The base station 600 according to an embodiment has a meaning as a terminal node of a network that directly communicates with the electronic device 1. Specific operations explained in this application as being performed by the base station may be performed by an upper node of the base station in some cases. That is, various operations performed for communications with a terminal such as the electronic device 1 in a network made up of a large number of network nodes including the base station may be performed by the base station or another network node other than the base station. The base station may be replaced with terms such as a Road Side Unit (RSU), a fixed station, a Base Station (BS), a Node B, an evolved-NodeB (eNB), a base transceiver system (BTS), an access point (AP), an MeNB (Macro eNB) and/or a Secondary eNB (SeNB).

The base station 600 according to an embodiment may include a wireless communications module 610, a network communications module 620, a computing module 630, and a server 640.

The function and configuration of the communications module 610 may be the same as or similar to those of the communications module 500 of the electronic device 1. The explanation of the communications module 610 of the base station 600 may be replaced with the explanation of the communications module 500 of the electronic device 1. The communications module 610 may receive the encryption data c transmitted from the communications module 500 of the electronic device 1. The communications module 610 may convert the transmitted encryption data c among communications protocols and provide it to the network communications module 620.

The computing module 630 may include various types of hardware, processors, accelerators and/or software, and may include a hardware accelerator such as a CPU or GPU as an example. The aforementioned hardware may perform add, multiplication, shift, XOR, AND, OR, NOR, and NAND, and additionally, may also perform computations on RSA and ECC public keys, like a modular computation such as a Modular addition and a Modular multiplication.

The server 640 may process data in a mobile edge computing manner. The mobile edge computing may also be applied to 4G and 5G environments, and is not limited thereto. The mobile edge computing may perform computing on the base station 600 at one edge to provide the service to the electronic device 1. For example, the server 640 may store data such as the encryption data c.

The network communications module 620 may transmit data to the service provider interface 700. For example, the network communications module 620 may transmit the encryption data c, which is provided from the communications module 610, to the service provider interface 700.

The service provider interface 700 according to an embodiment may include a decryption circuit 400 and a data base 710.

The decryption circuit 400 may include various types of hardware, processors, accelerators and/or software, and may include a hardware accelerator such as a CPU or GPU as an example. The aforementioned hardware may perform add, multiplication, shift, XOR, AND, OR, NOR, and NAND, and additionally may also perform computations on RSA and ECC public keys, like modular computations such as a Modular addition and a Modular multiplication.

The data base 710 may store the public key PK provided from the electronic device 1 and keep it registered. The data base 710 may provide the public key PK to the decryption circuit 400.

The service provider interface 700 may transmit and receive signals to and from the network communications module 620 through a transmitter and a receiver included in the service provider interface 700.

The decryption circuit 400 may decrypt the encryption data c, using the public key PK. The service provider interface 700 may provide the decrypted plain data m' to the data base 710 to be stored. The encryption data c provided from the electronic device 1 is confirmed with the public key PK, and the service provider interface 700 may confirm that the encryption data c is a signal transmitted from the electronic device 1. Therefore, a communications system 5 with high security may be provided.

Hereinafter, a communications system 6 including the electronic device 1 will be explained with reference to FIG. 14.

Figure 14:
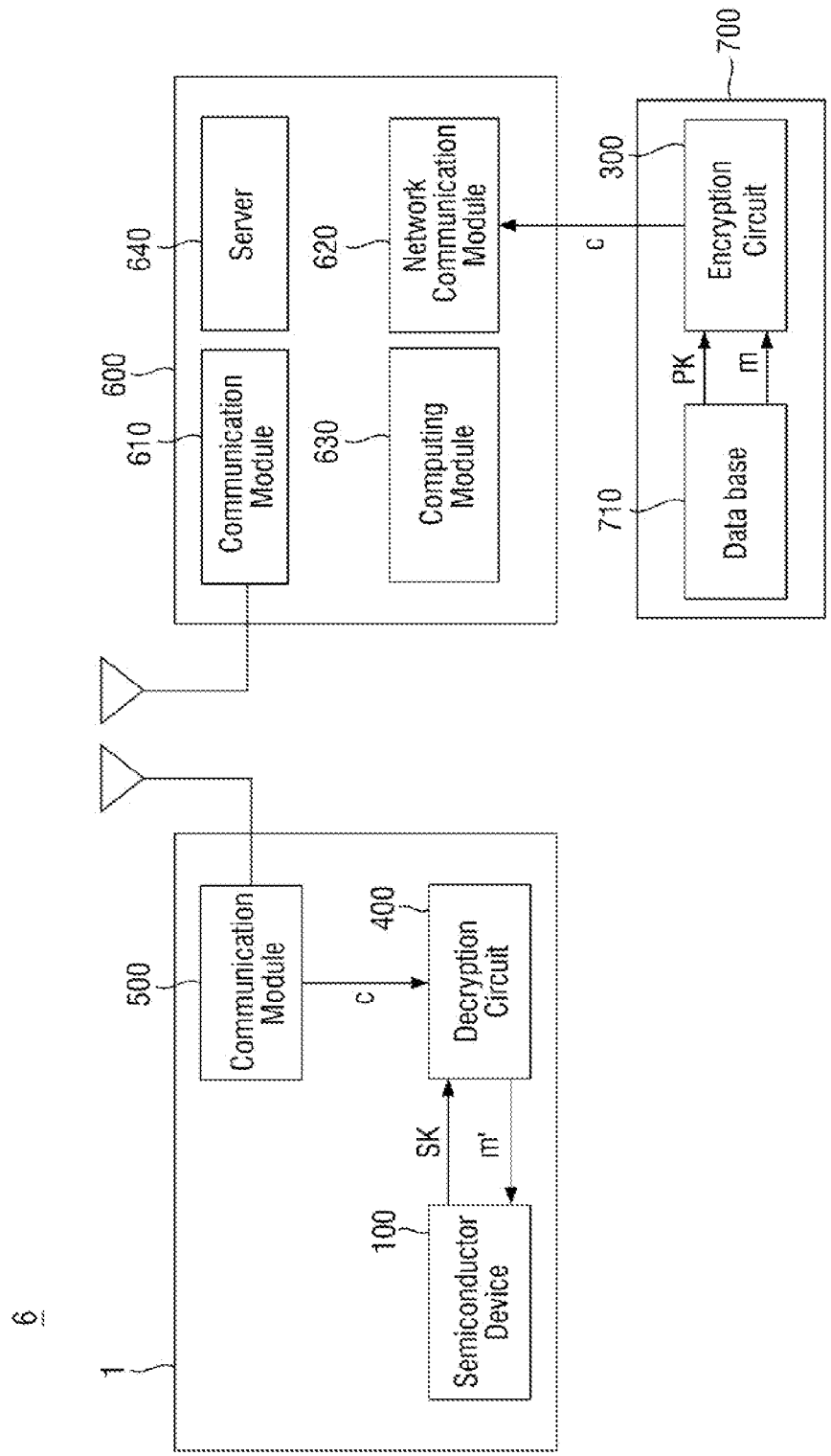
FIG. 14 is a block diagram for explaining a communications system according to an embodiment of the present disclosure.

FIG. 14 is used for explaining a communications system according to an embodiment of the present disclosure. For the sake of convenience of explanation, the repeated parts of the contents explained using FIGS. 1 to 7 and 13 may be briefly explained or omitted.

Referring to FIG. 14, the communications system 6 may include an electronic device 1, a base station 600 and a service provider interface 700. In an embodiment, the electronic device 1 may include a decryption circuit 400, and the service provider interface 700 may include an encryption circuit 300. The public key PK provided from the electronic device 1 may be stored in the data base 710.

In an embodiment, the data base 710 may provide the encryption circuit 300 with the public key PK and the plain data m. The encryption circuit 300 may generate the encryption data c, using the public key PK and the plain data m. That is, the encryption circuit 300 may convert the plain data m to be transmitted into the encryption data c, using the public key PK. The encryption circuit 300 of the service provider interface 700 may provide the encryption data c to the base station 600.

In an embodiment, the network communications module 620 of the base station 600 may be provided with the encryption data c from the service provider interface 700. The network communications module 620 may transfer the encryption data c to the communications module 610. The communications module 610 may transmit a signal, which may be obtained by converting the encryption data c, to the electronic device 1.

In an embodiment, the communications module 500 of the electronic device 1 may transfer the signal transmitted from the base station 600 to generate the encryption data c. The communications module 500 may transfer the encryption data c to the decryption circuit 400. The decryption circuit 400 may generate the plain data m', using the encryption data c provided from the communications module 500, and the secret key SK provided from the semiconductor device 100, such as, for example, from the secure memory block 162 of FIG. 2. That is, the decryption circuit 400 may decrypt the encryption data c using the secret key SK.

The decryption circuit 400 may restore the plain data m', by decrypting the encryption data c ultimately provided from the service provider interface 700, using the secret key SK. The electronic device 1 may restore the encrypted data, using the built-in secret key SK. However, even though the third part including the base station 600 knows the encryption data c in the middle, it is not feasible to know the contents of the plain data m', only by knowing the public key PK. Therefore, the communications system 6 with high security can be provided.

Hereinafter, a communications system 7 including the electronic device 1 and a data center 3000 will be explained with reference to FIG. 15.

Figure 15:
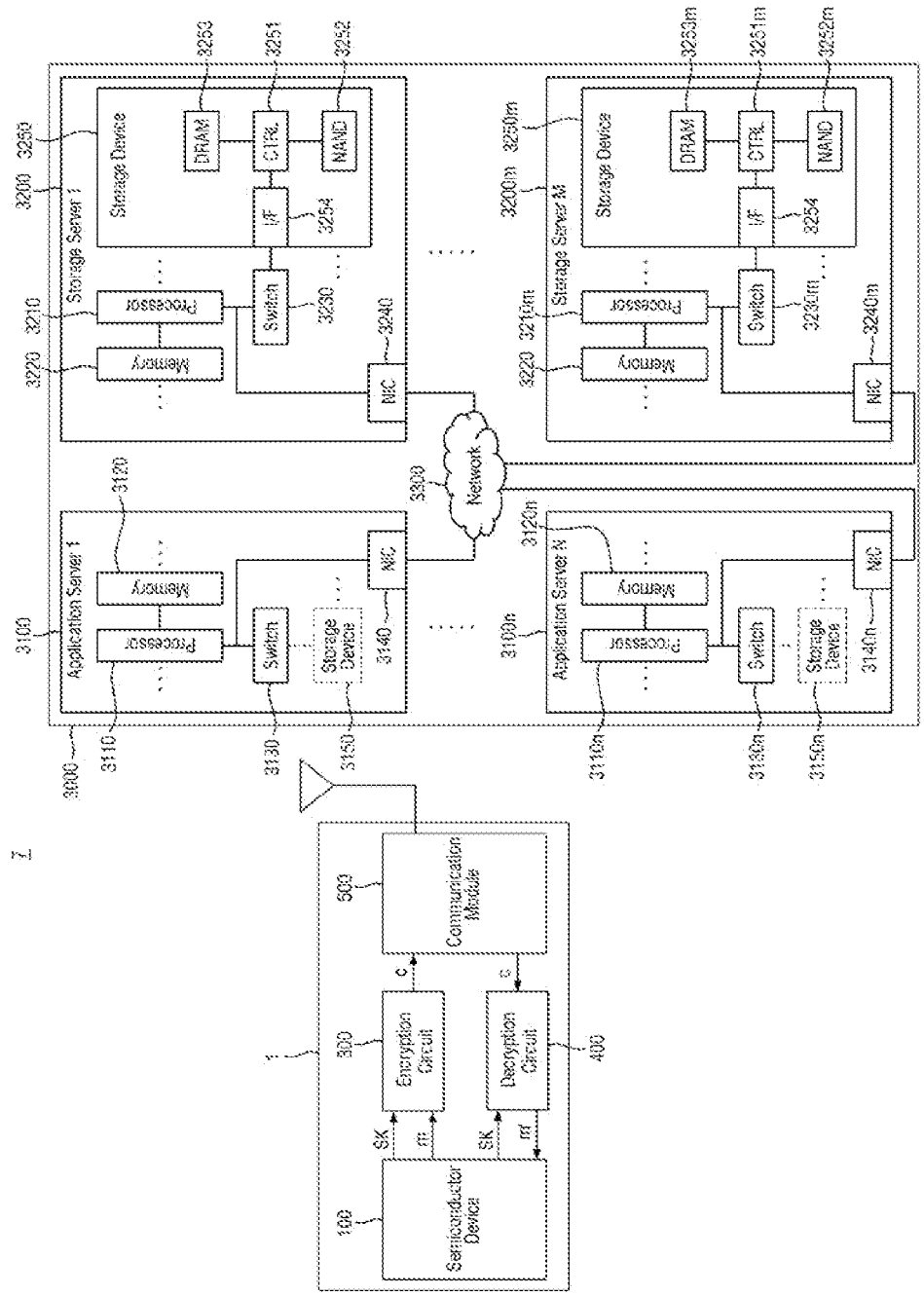
FIG. 15 is a block diagram for explaining a communications system according to an embodiment of the present disclosure.

FIG. 15 is used for explaining a communications system according to an embodiment of the present disclosure. For the sake of convenience of explanation, the repeated parts of the contents explained using FIGS. 1 to 7, 13 and 14 may be briefly explained or omitted.

Referring to FIG. 15, the communications system 7 may include the electronic device 1 and the data center 3000.

In an embodiment, the electronic device 1 may include the semiconductor device 100, the communications module 500, the encryption circuit 300 and the decryption circuit 400 as explained in FIGS. 1 to 7, 13 and 14. The encryption circuit 300 may generate the encryption data c using the secret key SK and the plain data m, and may transmit the encryption data c to the communications module 500. The communications module 500 may transmit the generated encryption data c to the outside through an antenna. The decryption circuit 400 may generate the plain data m', by decrypting the encryption data c, which is received through the communications module 500, using the secret key SK. The decryption circuit 400 may transfer the generated plain data m' to the semiconductor device 100.

The electronic device 1 may send and receive signals to and from the data center 3000 through the communications module 500. For example, the electronic device 1 may provide the generated encryption data c to the data center 3000 through the network 3300. For example, the electronic device 1 may be provided with the encryption data c generated in the data center 3000, such as from the application servers 3100 to 3100n and the storage servers 3200 to 3200m.

The data center 3000 is a facility that collects various data and provides services, and may also be referred to as a data storage center. The data center 3000 may be or include a system for search engines and data base operations, and may be or include a computing system used by companies such as banks or government agencies. The data center 3000 may include application servers 3100 to 3100n and storage servers 3200 to 3200m on site and/or interconnected through the network 3300, for example. The number of application servers 3100 to 3100n and the number of storage servers 3200 to 3200m may be variously selected according to an embodiment, and the number of application servers 3100 to 3100n and the number of storage servers 3200 to 3200m may be different from each other.

The application server 3100 or the storage server 3200 may include at least one of the processors 3110 and 3210 and at least one of the memories 3120 and 3220. Taking the storage server 3200 as an example, the processor 3210 may control the overall operation of the storage server 3200, and access the memory 3220 to execute commands and/or access data loaded into the memory 3220. The memory 3220 may be a Double Data Rate Synchronous DRAM (DDR SDRAM), a High Bandwidth Memory (HBM), a Hybrid Memory Cube (HMC), a Dual In-line Memory Module (DIMM), an Optane DIMM or a Non-volatile DIMM (NVMDIMM). According to an embodiment, the number of processors 3210 and the number of memories 3220 included in the storage server 3200 may be variously selected. In an embodiment, the processor 3210 and the memory 3220 may provide a processor-memory pair. In an embodiment, the number of processors 3210 and the number of memories 3220 may be different from each other. The processor 3210 may include a single-core processor or a multicore processor. The aforementioned explanation of the storage server 3200 may also be similarly applied to the application server 3100, so duplicate description may be omitted. According to an embodiment, the application server 3100 need not include the storage device 3150. The storage server 3200 may include at least one or more storage devices 3250. The number of storage devices 3250 included in the storage server 3200 may be variously selected according to an embodiment.

The application servers 3100 to 3100n and the storage servers 3200 to 3200m may communicate with each other through the network 3300. Also, the electronic device 1 may communicate with the application servers 3100 to 3100n and the storage servers 3200 to 3200m through the network 3300. The network 3300 may be implemented using a Fiber Channel (FC), an Ethernet, or the like. The FC is a medium used for relatively high-speed data transmissions, and may use an optical switch which provides high performance and/or high availability. The storage servers 3200 to 3200m may be provided as a file storage, a block storage or an object storage, depending on an access type of the network 3300.

Hereinafter, the application server 3100 and the storage server 3200 may be mainly explained. The explanation of the application server 3100 may also be applied to another application server 3100n, and the explanation of the storage server 3200 may also be applied to another storage server 3200m.

The application server 3100 may store the data requested to be stored by the user or the client in one of the storage servers 3200 to 3200m through the network 3300. For example, the application server 3100 receives the encryption data c from the electronic device 1, and may store the encryption data c and/or the decrypted plain data m, decrypted with the public key PK, in one of the storage servers 3200 to 3200m through the network 3300. Further, the application server 3100 may acquire the data requested to be read by the user or the client from one of the storage servers 3200 to 3200*m* through the network 3300. For example, the application server 3100 may be implemented as a web server or a Data base Management System (DBMS).

The application server 3100 may access the memory 3120*n* or the storage device 3150*n* included in another application server 3100*n* through the network 3300, or may access the memories 3220 to 3220*m* or the storage devices 3250 to 3250*m* included in the storage servers 3200 to 3200*m* through the network 3300. Thus, the application server 3100 can perform various operations on the data stored in the application servers 3100 to 3100*n* and/or the storage servers 3200 to 3200*m*. For example, the application server 3100 may execute commands to move or copy data between the application servers 3100 to 3100*n* and/or the storage servers 3200 to 3200*m*. The data may be moved to the memories 3120 to 3120*n* of the application servers 3100 to 3100*n* from the storage devices 3250 to 3250*m* of the storage servers 3200 to 3200*m* via the memories 3220 to 3220*m* of the storage servers 3200 to 3200*m* or directly.

The data that moves through the network 3300 may be data encrypted for security or privacy. For example, the data that moves through the network 3300 may include encryption data c provided from the electronic device 1 (encrypted with SK, decryptable with PK), and/or the encryption data c provided to the electronic device 1 (encrypted with PK, decryptable with SK).

Taking the storage server 3200 as an example, an interface 3254 may provide a physical connection between the processor 3210 and the controller 3251, and a physical connection between the NIC 3240 and the controller 3251. For example, the interface 3254 may be implemented as a Direct Attached Storage (DAS) type in which the storage device 3250 is directly connected by a dedicated cable.

The storage server 3200 may further include a switch 3230 and a NIC 3240. The switch 3230 may selectively connect the processor 3210 and the storage device 3250 or selectively connect the NIC 3240 and the storage device 3250, in accordance with the control of the processor 3210.

In an embodiment, the NIC 3240 may include a network interface card, a network adapter, and the like. The NIC 3240 may be connected to the network 3300 by a wired interface, a wireless interface, a Bluetooth® interface, an optical interface, or the like. The NIC 3240 may include an internal memory, a digital signal processor (DSP), a host bus interface, etc., and may be connected to the processor 3210 and/or the switch 3230 through the host bus interface. The host bus interface may also be implemented as one of the examples of the aforementioned interface 3254. In an embodiment, the NIC 3240 may be integrated with at least one of the processor 3210, the switch 3230, and the storage device 3250.

In the storage servers 3200 to 3200*m* or the application servers 3100 to 3100*n*, the processor may transmit commands to the storage devices 3150 to 3150*n* and 3250 to 3250*m* or to the memories 3120 to 3120*n* and 3220 to 3220*m* to program and/or read the data.

The storage devices 3150 to 3150*m* and 3250 to 3250*m* may transmit the control signal and the command/address signal to the NAND flash memory devices 3252 to 3252*m* in response to the read command received from the processor. As a result, when data is read from the NAND flash memory devices 3252 to 3252*m*, a Read Enable (RE) signal is input as the data output control signal, and may play a role of outputting the data to the Distributed Queuing System (DQS) bus. The DQS Data Strobe may be generated using the RE signal. The command and address signals may be latched in the page buffer according to the rising edge or the falling edge of the Write Enable (WE) signal.

In an embodiment, the NAND flash memory devices 3252 to 3252*m* may include data information specific to the NAND flash memory devices 3252 to 3252*m*. The NAND flash memory devices 3252 to 3252*m* may process data to generate a password key having a value of a prime number. The NAND flash memory devices 3252 to 3252*m* may generate a public key and a secret key, using the password key. The NAND flash memory devices 3252 to 3252*m* may encrypt or decrypt data, using the secret key. The data output from the NAND flash memory devices 3252 to 3252*m* may be data encrypted or decrypted, using the secret key. The password key, the public key and the secret key of the NAND flash memory devices 3252 to 3252*m* may be different for each of the NAND flash memory devices 3252 to 3252*m*.

The controller 3251 may generally control the operation of the storage device 3250. In an embodiment, the controller 3251 may include a Static Random-Access Memory (SRAM). The controller 3251 may write data on the NAND flash 3252 in response to a write command, or may read the data from the NAND flash 3252 in response to a read command. For example, the write command and/or the read command may be provided to the processor 3210 in the storage server 3200, the processor 3210*m* in another storage server 3200*m* or the processors 3110 and 3110*n* in the application servers 3100 and 3100*n*.

The DRAM 3253 may temporarily store (buffer) data to be written on the NAND flash 3252 and data read from the NAND flash 3252. Also, the DRAM 3253 may store metadata. Here, the metadata may be data generated by the controller 3251 to manage the user data or the NAND flash 3252. The storage device 3250 may include a Secure Element (SE) for security or privacy.

Figure 16:
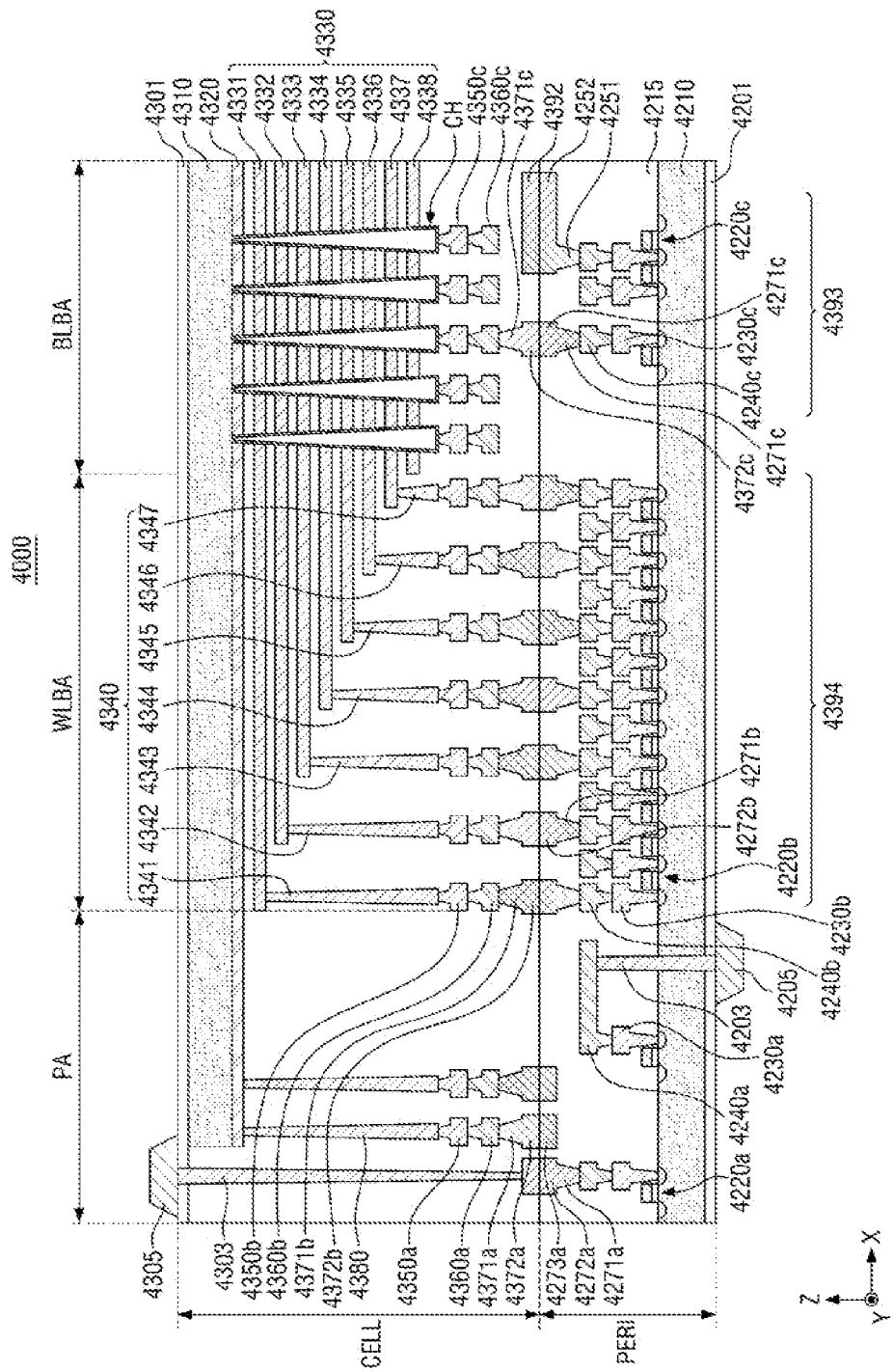
FIG. 16 is a layout diagram with sectional view of a non-volatile memory device according to an embodiment.

FIG. 16 shows a sectional view of a non-volatile memory device according to an embodiment.

Referring to FIG. 16, a memory device 4000 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then connecting the upper chip and the lower chip in a bonding manner. For example, the bonding manner may include a method of electrically connecting a bonding metal formed on an uppermost metal layer of the upper chip and a bonding metal formed on an uppermost metal layer of the lower chip. For example, when the bonding metals may be formed of copper (Cu), the bonding manner may be a Cu—Cu bonding, and the bonding metals may also be formed of aluminum or tungsten. Here, the cell region CELL may correspond to the memory cell array 160 of FIG. 2, and the peripheral circuit region PERI may correspond to the voltage generator 110, the address decoder 130, the I/O circuit 140, the control logic 150 and/or the secure module 170 of FIG. 2.

Each of the peripheral circuit region PERI and the cell region CELL of the memory device 4000 may include an external pad bonding area PA, a word line bonding area WLBA, and a bit line bonding area BLBA.

The peripheral circuit region PERI may include a first substrate 4210, an interlayer insulating layer 4215, a plurality of circuit elements 4220*a*, 4220*b*, and 4220*c* formed on the first substrate 4210, first metal layers 4230*a*, 4230*b*, and 4230*c* respectively connected to the plurality of circuit elements 4220*a*, 4220*b*, and 4220*c*, and second metal layers 4240*a*, 4240*b*, and 4240*c* formed on the first metal layers

4230*a*, 4230*b*, and 4230*c*, respectively. In an embodiment, the first metal layers 4230*a*, 4230*b*, and 4230*c* may be formed of tungsten having relatively high resistance, and the second metal layers 4240*a*, 4240*b*, and 4240*c* may be formed of copper having relatively low resistance.

In an embodiment illustrated in FIG. 16, although the first metal layers 4230*a*, 4230*b*, and 4230*c* and the second metal layers 4240*a*, 4240*b*, and 4240*c* are shown and described, they are not limited thereto, and one or more metal layers may be further formed on the second metal layers 4240*a*, 4240*b*, and 4240*c*. At least a portion of the one or more metal layers formed on the second metal layers 4240*a*, 4240*b*, and 4240*c* may be formed of aluminum or the like having a higher resistance than those of copper forming the second metal layers 4240*a*, 4240*b*, and 4240*c*.

The interlayer insulating layer 4215 may be disposed on the first substrate 4210 and cover the plurality of circuit elements 4220*a*, 4220*b*, and 4220*c*, the first metal layers 4230*a*, 4230*b*, and 4230*c*, and the second metal layers 4240*a*, 4240*b*, and 4240*c*. The interlayer insulating layer 4215 may include an insulating material such as silicon oxide, silicon nitride, or the like.

Lower bonding metals 4271*b* and 4272*b* may be formed on the second metal layer 4240*b* in the word line bonding area WLBA. In the word line bonding area WLBA, the lower bonding metals 4271*b* and 4272*b* in the peripheral circuit region PERI may be electrically connected to upper bonding metals 4371*b* and 4372*b* in the cell region CELL in a bonding manner, and the lower bonding metals 4271*b* and 4272*b* and the upper bonding metals 4371*b* and 4372*b* may be formed of aluminum, copper, tungsten, or the like.

The cell region CELL may include at least one memory block. The cell region CELL may include a second substrate 4310 and a common source line 4320. On the second substrate 4310, a plurality of word lines 4330 including word lines 4331 to 4338 may be stacked in a direction, such as a Z-axis direction, perpendicular to an upper surface of the second substrate 4310. At least one string select line and at least one ground select line may be arranged on and below the plurality of word lines 4330, respectively, and the plurality of word lines 4330 may be disposed between the at least one string select line and the at least one ground select line.

In the bit line bonding area BLBA, a channel structure CH may extend in a direction perpendicular to the upper surface of the second substrate 4310, and pass through the plurality of word lines 4330, the at least one string select line, and the at least one ground select line. The channel structure CH may include a data storage layer, a channel layer, a buried insulating layer, and the like, and the channel layer may be electrically connected to a first metal layer 4350*c* and a second metal layer 4360*c*. For example, the first metal layer 4350*c* may be a bit line contact, and the second metal layer 4360*c* may be a bit line. In an embodiment, the bit line 4360*c* may extend in a first direction, such as a Y-axis direction, parallel to the upper surface of the second substrate 4310.

In an embodiment illustrated in FIG. 16, an area in which the channel structure CH, the bit line 4360*c*, and the like are disposed may be defined as the bit line bonding area BLBA. In the bit line bonding area BLBA, the bit line 4360*c* may be electrically connected to the circuit elements 4220*c* providing a page buffer 4393 in the peripheral circuit region PERI. For example, the bit line 4360*c* may be connected to upper bonding metals 4371*c* and 4372*c* in the cell region CELL, and the upper bonding metals 4371*c* and 4372*c* may be connected to lower bonding metals 4271*c* and 4272*c* connected to the circuit elements 4220*c* of the page buffer 4393.

In the word line bonding area WLBA, the plurality of word lines 4330 may extend in a second direction, such as an X-axis direction, parallel to the upper surface of the second substrate 4310, and may be connected to a plurality of cell contact plugs 4340 including cell contact plugs 4341 to 4347. The plurality of word lines 4330 and the plurality of cell contact plugs 4340 may be connected to each other in pads provided by at least a portion of the plurality of word lines 4330 extending in different lengths in the second direction. A first metal layer 4350*b* and a second metal layer 4360*b* may be connected to an upper portion of the plurality of cell contact plugs 4340 connected to the plurality of word lines 4330, such as sequentially. The plurality of cell contact plugs 4340 may be connected to the circuit region PERI by the upper bonding metals 4371*b* and 4372*b* of the cell region CELL and the lower bonding metals 4271*b* and 4272*b* of the peripheral circuit region PERI in the word line bonding area WLBA.

The plurality of cell contact plugs 4340 may be electrically connected to the circuit elements 4220*b* providing a row decoder 4394 in the peripheral circuit region PERI. In an embodiment, operating voltages of the circuit elements 4220*b* providing the row decoder 4394 may be different than operating voltages of the circuit elements 4220*c* providing the page buffer 4393. For example, operating voltages of the circuit elements 4220*c* providing the page buffer 4393 may be greater than operating voltages of the circuit elements 4220*b* providing the row decoder 4394.

A common source line contact plug 4380 may be disposed in the external pad bonding area PA. The common source line contact plug 4380 may be formed of a conductive material such as a metal, a metal compound, polysilicon, or the like, and may be electrically connected to the common source line 4320. A first metal layer 4350*a* and a second metal layer 4360*a* may be stacked on an upper portion of the common source line contact plug 4380, such as sequentially. For example, an area in which the common source line contact plug 4380, the first metal layer 4350*a*, and the second metal layer 4360*a* are disposed may be defined as the external pad bonding area PA.

Input-output pads 4205 and 4305 may be disposed in the external pad bonding area PA. Referring to FIG. 16, a lower insulating film 4201 covering a lower surface of the first substrate 4210 may be formed below the first substrate 4210, and a first input-output pad 4205 may be formed on the lower insulating film 4201. The first input-output pad 4205 may be connected to at least one of the plurality of circuit elements 4220*a*, 4220*b*, and 4220*c* disposed in the peripheral circuit region PERI through a first input-output contact plug 4203, and may be separated from the first substrate 4210 by the lower insulating film 4201. In addition, a side insulating film may be disposed between the first input-output contact plug 4203 and the first substrate 4210 to electrically separate the first input-output contact plug 4203 and the first substrate 4210.

Referring to FIG. 16, an upper insulating film 4301 covering the upper surface of the second substrate 4310 may be formed on the second substrate 4310, and a second input-output pad 4305 may be disposed on the upper insulating layer 4301. The second input-output pad 4305 may be connected to at least one of the plurality of circuit elements 4220*a*, 4220*b*, and 4220*c* disposed in the peripheral circuit region PERI through a second input-output contact plug 4303.

According to an embodiment, the second substrate 4310 and the common source line 4320 need not be disposed in an area in which the second input-output contact plug 4303 is disposed. Also, the second input-output pad 4305 need not overlap the word lines 4330 in the third direction such as the Z-axis direction. Referring to FIG. 16, the second input-output contact plug 4303 may be separated from the second substrate 4310 in a direction, parallel to the upper surface of the second substrate 4310, and may pass through the interlayer insulating layer 4315 of the cell region CELL to be connected to the second input-output pad 4305.

According to an embodiment, the first input-output pad 4205 and the second input-output pad 4305 may be selectively formed. For example, the memory device 4000 may include only the first input-output pad 4205 disposed on the first substrate 4210 or the second input-output pad 4305 disposed on the second substrate 4310. Alternatively, the memory device 4000 may include both the first input-output pad 4205 and the second input-output pad 4305.

A metal pattern in an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 4000 may include a lower metal pattern 4273a, corresponding to an upper metal pattern 4372a formed in an uppermost metal layer of the cell region CELL, and having the same shape as the upper metal pattern 4372a of the cell region CELL, in an uppermost metal layer of the peripheral circuit region PERI. In the peripheral circuit region PERI, the lower metal pattern 4273a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 4271b and 4272b may be formed on the second metal layer 4240b in the word line bonding area WLBA. In the word line bonding area WLBA, the lower bonding metals 4271b and 4272b of the peripheral circuit region PERI may be electrically connected to the upper bonding metals 4371b and 4372b of the cell region CELL by a Cu—Cu bonding.

Further, the bit line bonding area BLBA, an upper metal pattern 4392, corresponding to a lower metal pattern 4252 formed in the uppermost metal layer of the peripheral circuit region PERI, and having the same shape as the lower metal pattern 4252 of the peripheral circuit region PERI, may be formed in an uppermost metal layer of the cell region CELL. A contact need not be formed on the upper metal pattern 4392 formed in the uppermost metal layer of the cell region CELL.

In an embodiment, corresponding to a metal pattern formed in an uppermost metal layer in one of the cell region CELL and the peripheral circuit region PERI, a reinforcement metal pattern having the same shape as the metal pattern may be formed in an uppermost metal layer in another one of the cell region CELL and the peripheral circuit region PERI, and a contact need not be formed on the reinforcement metal pattern.

In concluding the detailed description, those of ordinary skill in the pertinent art will appreciate that many variations and modifications may be made to the disclosed embodiments without substantially departing from the principles of the present disclosure. Therefore, the disclosed embodiments are used in a generic and descriptive sense, only, and not for purposes of limitation.

What is claimed is:

1. A nonvolatile memory device comprising a memory cell array and a secure module,
wherein the secure module comprises a semiconductor password key generator configured to process first data including a first type of information about the nonvolatile memory device stored in the memory cell array and inaccessible from outside the device to generate a first password key, and process second data including a second type of information, different from the first type of information, about the nonvolatile memory device stored in the memory cell array and inaccessible from outside the device to generate a second password key,
wherein the secure module comprises a semiconductor public generator configured to generate a public key and a secret key by a public-key cryptography algorithm using the first password key and the second password key,
wherein the secure module provides the first password key, the second password key, the public key, and the secret key to the memory cell array,
wherein the memory cell array is configured to store the first password key, the second password key, the public key, and the secret key,
wherein the second data is different from the first data,
wherein the first data includes information about a wafer production of the nonvolatile memory device and the second data includes information about electrical operating characteristics of the nonvolatile memory device,
wherein the first data and the second data are unique for different memory devices,
wherein a value of the first password key and a value of the second password key are prime numbers, and
wherein the public key is provided to a computer host connected to the nonvolatile memory device.

2. The nonvolatile memory device of claim 1, wherein the first data includes the first type of information comprising unique identification (ID) data of the nonvolatile memory device.

3. The nonvolatile memory device of claim 2, wherein the second data includes the second type of information comprising direct current (DC) trim data of the nonvolatile memory device.

4. The nonvolatile memory device of claim 1, wherein processing of the first data includes insertion of m random bits into the first data to generate the first password key, processing of the second data includes insertion of n random bits into the second data to generate the second password key, and m and n are natural numbers of 1 or more.

5. The nonvolatile memory device of claim 1, wherein: the memory cell array includes a general memory block and a secure memory block, the general memory block is accessed by a general access command provided from the host, and the secure memory block is accessed by a secure access command provided from the host.

6. The nonvolatile memory device of claim 5, wherein: the secure memory block is not accessed by the general access command, and the first password key, the second password key, and the secret key are stored in the secure memory block.

7. The nonvolatile memory device of claim 6, wherein the public key is stored in the general memory block.

8. The nonvolatile memory device of claim 1, wherein encryption data obtained by encrypting data stored in the memory cell array using the secret key is generated, and the encryption data is provided to the host.

9. The nonvolatile memory device of claim 8, wherein the encryption data provided to the host is decrypted, using the public key provided to the host.

10. The nonvolatile memory device of claim 1, wherein encryption data, which is encrypted using the public key provided to the host, is provided from the host.

11. The nonvolatile memory device of claim 10, wherein the encryption data is decrypted, using the secret key.

12. An electronic device comprising:
a first memory device including a first memory cell array; and
a second memory device including a second memory cell array,
wherein the first memory device is configured to store, in the first memory cell array, first data and second data respectively including a first type of information inaccessible from outside the first memory device and a second type of information inaccessible from outside the first memory device, different from the first type of information,
wherein the second memory device is configured to store, in the second memory cell array, third data and fourth data respectively including the first type of information inaccessible from outside the second memory device and the second type of information inaccessible from outside the second memory device,
wherein each of the first data, second data, third data, and fourth data are different from each other,
wherein the first memory device is configured to:
process the first data to generate a first password key,
process the second data to generate a second password key, wherein a value of the first password key and a value of the second password key being prime numbers,
generate a first public key and a first private key by a public-key cryptography algorithm, using the first password key and the second password key, and
store the first password key, the second password key, the first public key and the first private key in the first memory cell array,
wherein the second memory device is configured to:
process the third data to generate a third password key,
process the fourth data to generate a fourth password key, wherein a value of the third password key and a value of the fourth password key being prime numbers,
generate a second public key and a second private key by the public-key cryptography algorithm, using the third password key and the fourth password key, and
store the third password key, the fourth password key, the second public key and the second private key in the second memory cell array,
wherein the first data and the third data include information about wafer productions of the first memory device and second memory device, respectively, and the second data and fourth data include information about electrical operating characteristics of the first memory device and second memory device, respectively, and
wherein each of the first password key, second password key, third password key and fourth password keys are different from each other,
each of the first public key and second public keys are different from each other, and
each of the first private key and second private keys are different from each other.

13. The electronic device of claim 12, wherein the first data includes unique identification (ID) data of the first memory device, the third data includes unique ID data of the second memory device, and the first data and the third data are different from each other.

14. The electronic device of claim 13, wherein the second data includes direct current (DC) trim data of the first memory device, the fourth data includes direct current (DC) trim data of the second memory device, and the second data and the fourth data are different from each other.

15. The electronic device of claim 12, further comprising:
a computer host configured to send and receive data to and from the first memory device and the second memory device, wherein the first public key and the second public key are provided to the host, and the host is configured to provide the first memory device with first encryption data obtained by encrypting the first data stored in the host using the first public key, and provide the second memory device with second encryption data obtained by encrypting the second data stored in the host using the second public key.

16. The electronic device of claim 15, wherein: the first memory device is configured to decrypt the first encryption data, using the first private key, and the second memory device is configured to decrypt the second encryption data, using the second private key.

17. A service provider interface comprising:
a decryption circuit;
an encryption circuit;
a receiver configured to receive a first signal from an electronic device; and
a transmitter configured to provide a second signal to the electronic device,
wherein the first signal includes a public key and encryption data generated using a secret key of the electronic device,
wherein the secret key is generated together with the public key by a public-key cryptography algorithm, using a first password key of the electronic device and a second password key of the electronic device,
wherein the first password key is generated by processing first data including a first type of information about a memory device included in the electronic device,
wherein the second password key is generated by processing second data different from the first data and including a different type of information about the memory device included in the electronic device,
wherein the first type and the different types of information are inaccessible from outside of the memory device,
wherein the first data includes information about a wafer production of the memory device and the second data includes information about electrical operating characteristics of the memory device, wherein the first data and the second data are unique for different memory devices, and
wherein the decryption circuit is configured to decrypt the encryption data using the public key.

18. The service provider interface of claim 17, wherein the first data includes unique identification (ID) data about the memory device, and the second data includes direct current (DC) trim data of the memory device.

19. The service provider interface of claim 17, wherein: the encryption circuit is configured to generate encryption data by encrypting data using the public key, and the second signal includes the encryption data generated by the encryption circuit.

* * * * *